(12) United States Patent
Shin et al.

(10) Patent No.: US 11,228,438 B2
(45) Date of Patent: Jan. 18, 2022

(54) SECURITY DEVICE FOR PROVIDING SECURITY FUNCTION FOR IMAGE, CAMERA DEVICE INCLUDING THE SAME, AND SYSTEM ON CHIP FOR CONTROLLING THE CAMERA DEVICE

(71) Applicant: SAMSUNG ELECTRONICS CO., LTD., Suwon-si (KR)

(72) Inventors: Jong-hoon Shin, Hwaseong-si (KR); Ki-seok Bae, Hwaseong-si (KR); Hong-mook Choi, Bucheon-si (KR); Ji-su Kang, Seoul (KR); Jae-hyeok Kim, Seoul (KR); Hye-soo Lee, Yongin-si (KR); Hyo-sun Hwang, Bucheon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 97 days.

(21) Appl. No.: 16/146,409

(22) Filed: Sep. 28, 2018

(65) Prior Publication Data
US 2019/0097805 A1 Mar. 28, 2019

(30) Foreign Application Priority Data

Sep. 28, 2017 (KR) .......................... 10-2017-0126348
Aug. 7, 2018 (KR) .......................... 10-2018-0092047

(51) Int. Cl.
*H04L 9/32* (2006.01)
*H04N 21/426* (2011.01)
(Continued)

(52) U.S. Cl.
CPC ............. *H04L 9/3228* (2013.01); *G06N 3/08* (2013.01); *H04L 9/0819* (2013.01);
(Continued)

(58) Field of Classification Search
CPC ... H04L 9/3228; H04L 9/0819; H04L 9/0894; H04L 9/3242; H04L 9/3271;
(Continued)

(56) References Cited

U.S. PATENT DOCUMENTS 5,898,779 A 4/1999 Squilla et al.
7,139,407 B2 11/2006 Wakao
(Continued)

FOREIGN PATENT DOCUMENTS

CN 101075874 A 11/2007
CN 101236645 A 8/2008
(Continued)

OTHER PUBLICATIONS

Arya et al., "Image authentication based on salient regions of image," 2017 International Electrical Engineering Congress (iEECON) Year: 2017 | Conference Paper | Publisher: IEEE.*
(Continued)

*Primary Examiner* — Roderick Tolentino
(74) *Attorney, Agent, or Firm* — Sughrue Mion, PLLC

(57) ABSTRACT

A security device providing a security function for an image, a camera device including the same, and a system on chip (SOC) for controlling the camera device are provided. An image transmitting device may include an image processor configured to process an image to be transmitted to an external device, and a security circuit including a key shared with the external device. The security circuit may be configured to generate a tag used for image authentication by using data of a partial region of the image and the key based on region information for selecting the partial region of the image. The image transmitting device may be configured to transmit the tag, generated to correspond to the image, to the external device with data of the image.

12 Claims, 19 Drawing Sheets

(51) Int. Cl.
    *H04N 1/00*     (2006.01)
    *H04L 9/08*     (2006.01)
    *H04L 29/06*    (2006.01)
    *G06N 3/08*     (2006.01)
    *H04N 21/414*   (2011.01)
    *H04N 21/4223*  (2011.01)

(52) U.S. Cl.
    CPC .......... *H04L 9/0894* (2013.01); *H04L 9/3242* (2013.01); *H04L 9/3271* (2013.01); *H04L 63/0435* (2013.01); *H04N 1/00856* (2013.01); *H04N 21/41422* (2013.01); *H04N 21/4223* (2013.01); *H04N 21/42653* (2013.01); *H04N 21/42684* (2013.01); *H04N 2201/0084* (2013.01)

(58) Field of Classification Search
    CPC .......... H04L 63/0435; H04N 21/42653; H04N 21/42684; H04N 21/41422; H04N 21/4223; H04N 1/00856; H04N 2201/0084; G06K 9/00114; G06Q 20/40; G06T 7/00; G06T 7/80; G06N 3/08
    See application file for complete search history.

(56) References Cited

U.S. PATENT DOCUMENTS

| | | | |
|---|---|---|---|
| 8,307,214 | B2 | 11/2012 | Lundberg et al. |
| 8,547,205 | B2 | 10/2013 | Pang et al. |
| 8,621,577 | B2 | 12/2013 | Choi et al. |
| 9,165,196 | B2 | 10/2015 | Kesavan et al. |
| 9,288,048 | B2 | 3/2016 | Han et al. |
| 9,374,423 | B2 | 6/2016 | Crosbie et al. |
| 2006/0242416 | A1 | 10/2006 | Sharma et al. |
| 2008/0298596 | A1* | 12/2008 | Kuraki .................. H04N 1/4413 380/283 |
| 2010/0070766 | A1 | 3/2010 | Lu |
| 2010/0128872 | A1* | 5/2010 | Cordery ................ G06F 21/606 380/255 |
| 2011/0019816 | A1* | 1/2011 | Inami ....................... H04L 9/08 380/28 |
| 2011/0069342 | A1* | 3/2011 | Saisho ..................... H04N 1/41 358/1.15 |
| 2013/0091212 | A1 | 4/2013 | Rajakarunanayake |
| 2013/0195272 | A1 | 8/2013 | Nagai et al. |
| 2013/0283061 | A1* | 10/2013 | Jeong ................... G06F 21/6227 713/189 |
| 2014/0282923 | A1* | 9/2014 | Narayan ............... H04L 9/3228 726/5 |
| 2014/0321640 | A1 | 10/2014 | Johne et al. |
| 2015/0050922 | A1 | 2/2015 | Ramalingam et al. |
| 2015/0301957 | A1 | 10/2015 | Elias et al. |
| 2015/0372754 | A1 | 12/2015 | Choi et al. |
| 2016/0277189 | A1 | 9/2016 | Ahn et al. |
| 2016/0323741 | A1* | 11/2016 | Lee .......................... G06F 21/44 |
| 2017/0111177 | A1* | 4/2017 | Oguma .................... H04L 67/12 |
| 2018/0026789 | A1* | 1/2018 | Qiu ...................... H04W 12/069 713/168 |

FOREIGN PATENT DOCUMENTS

| | | |
|---|---|---|
| CN | 101729256 A | 6/2010 |
| CN | 104581431 A | 4/2015 |
| JP | 2001285620 A | 10/2001 |
| JP | 2005-184368 A | 7/2005 |
| KR | 10-0909885 B1 | 7/2009 |
| KR | 10-1665199 B1 | 10/2016 |
| KR | 10-1740957 B1 | 5/2017 |
| TW | 201330571 A1 | 7/2013 |

OTHER PUBLICATIONS

Chen et al., "Multi-block dependency based watermarking scheme for binary-text image authentication," Signal and Information Processing Association Annual Summit and Conference (APSIPA), 2014 Asia-Pacific Year: 2014 | Conference Paper | Publisher: IEEE.*

Bravo-Solorio, Sergio et al., "Secure fragile watermarking method for image authentication with improved tampering localisation and self-recovery capabilities", Signal Processing, vol. 91, No. 4, Apr. 1, 2011, pp. 728-739, XP027578582. (12 page total).

Pamboukian, Sergio Vicente D. et al., "Watermarking JBIG2 Text Region for Image Authentication", Image Processing, 2005, ICIP 2005, IEEE International Conference on, IEEE, Picataway, NJ, vol. 2, Sept. 11, 2005, pp. 1078-1081, XP010851244. (4 pages total).

Thirunavukkarasu, V. et al., "Passive Image Tamper Detection Based on Fast Retina Key point Descriptor", 2016 IEEE International Conference on Advances in Computer Applications (ICACA), Oct. 24, 2016, pp. 279-285, XP033082266. (7 pages total).

Winkler, Thomas, "Security and Privacy in Smart Camera Networks, Dissertation, May 2011 (corresponding to following, as cited in Cite No. 10: Security and Privacy in Smart Camera Networks—Section 4.4 Secure Video Streaming", ICDSC '10 Proceedings of the Fourth ACM/IEEE International Conference on Distributed Smart Cameras, Aug. 31, 2010-Sep. 4, 2010, Atlanta, GA, USA, XP055313457. (136 pages total)).

Kim, Mi-Ae et al., "Digital Signature with Localization for Image Authentication", 2011 IEEE International Conference on Consumer Electronics (ICCE), Jan. 9, 2011, pp. 725-726, XP031921478. (2 page total).

I-Chuan Chang Bor-Wen Hsu et al., "A DCT Quantization-Based Image Authentication System for Digital Forensics", Proceedings of the First Internationai Workshop on Systematic Approaches to Digital Forensic Engineering (SADFE'05), IEEE Computer Society, Nov. 7, 2005, XP010892734. (13 pages total).

Haas, Roland E. et al., "Automotive Connectivity, Cyber Attack Scenarios and Automotive Cyber Security", 2017 IEEE International Conference on Electro Information Technology (EIT), IEEE, May 14, 2017, pp. 635-639, XP033158472. (5 pages total).

Search Report dated Jan. 23, 2019 by the European Patent Office in counterpart European Patent Application No. 18197421.3.

Communication dated Oct. 27, 2021 by the Intellectual Property Office of Taiwan in counterpart Taiwanese Patent Application No. 107134149.

Office Action issued in Chinese Application No. 201811134014.7 dated Nov. 12, 2021.

* cited by examiner

SECURITY DEVICE FOR PROVIDING SECURITY FUNCTION FOR IMAGE, CAMERA DEVICE INCLUDING THE SAME, AND SYSTEM ON CHIP FOR CONTROLLING THE CAMERA DEVICE

CROSS-REFERENCE TO RELATED APPLICATIONS

This application claims priority from Korean Patent Application Nos. 10-2017-0126348 and 10-2018-0092047, respectively filed on Sep. 28, 2017 and Aug. 7, 2018, in the Korean Intellectual Property Office, the disclosures of which are incorporated herein in their entirety by reference.

BACKGROUND

1. Field

Apparatuses and methods consistent with example embodiments relate to a security device, and more particularly, to a security device providing a security function for an image, a camera device including the same, and a system on chip for controlling the camera device.

2. Description of the Related Art

Currently, a security function is not properly provided in an automotive camera device including a camera sensor. In a similar field, a common surveillance camera is equipped with security measures to encrypt an image and transmit the encrypted image to a server. However, an existing security method is not suitable for use with an image being transmitted in real time such as in the case of the automotive camera device.

Recently, in relation to deep learning, autonomous driving has been on the spotlight. The intention of the corresponding technology is analyzing the image transmitted from the camera sensor, recognizing a state, and controlling driving. However, when a forged or falsified image is transmitted from an illegitimate or unauthorized camera sensor, the security and safety of the automobile may be seriously compromised and may even result in a fatal automobile accident.

SUMMARY

One or more example embodiments provide a security device providing a security function by authenticating a legal camera sensor and by preventing an image from being forged or falsified, a camera device including the same, and a system on chip (SOC) for controlling the camera device.

According to an aspect of an example embodiment, there is provided an image transmitting device including: an image processor configured to process an image to be transmitted to an external device; and a security circuit including a key shared with the external device, the security circuit being configured to generate a tag used for image authentication by using data of a partial region of the image and the key based on region information for selecting a partial region of the image. The image transmitting device may be configured to transmit the tag, generated to correspond to the image, to the external device with the data of the image.

According to an aspect of an example embodiment, there is provided a method of operating an image transmitting device. The method may include: obtaining a session key to be used for image authentication through communication with an external device; selecting a partial region of an image to be transmitted to the external device based on region information representing a position of a partial region within the image; generating a tag corresponding to the image by using the session key and data of a partial region of the image; and transmitting a packet including the image and the tag corresponding to the image to the external device.

According to an aspect of an example embodiment, there is provided a system on chip (SOC) receiving an image from an image transmitting device. The SOC may include an authenticator configured to check whether the image transmitting device is an authorized device by performing a device authentication process with the image transmitting device; and an image processor configured to receive, from the image transmitting device, the image and a first tag corresponding to the image, calculate a second tag by using data of a partial region of the image and a session key based on region information for selecting a partial region of the image, and perform image authentication by comparing the first tag with the second tag.

In the security device according to an example embodiment, the camera device including the same, and the SOC for controlling the camera device, because it is possible to check a legal camera device by authenticating a camera senor that provides an image and to check whether an image transmitted from the camera device is forged or falsified, it is possible to improve a security function of a system in which the camera device is used.

In addition, in the security device according to an example embodiment, the camera device including the same, and the SOC for controlling the camera device, when the camera device is applied to an autonomous system, because it is possible to prevent a forged or falsified image from being used for the autonomous system, it is possible to provide an autonomous system with improved performance, capable of preventing a fatal accident from occurring.

BRIEF DESCRIPTION OF THE DRAWINGS

The above and/or other aspects will be more clearly understood from the following detailed description taken in conjunction with the accompanying drawings in which.

DETAILED DESCRIPTION OF EXAMPLE EMBODIMENTS

Recently, in relation to deep learning, an autonomous system has been on the spotlight. This technology allows analyzing an image transmitted from a camera sensor, recognizing a state, and controlling vehicle driving. For this purpose, it is necessary to determine whether the image is transmitted from authorized camera device and the transmitted image is not forged or falsified. When it is determined that the transmitted image is forged or falsified, an attacker may transmit a forged or falsified image from the camera device that is not authenticated, which may cause a fatal accident that may threaten the life of a driver. Therefore, in an automotive product, it is necessary to authenticate the camera device and to authenticate the image transmitted by the corresponding camera.

Figure 1:
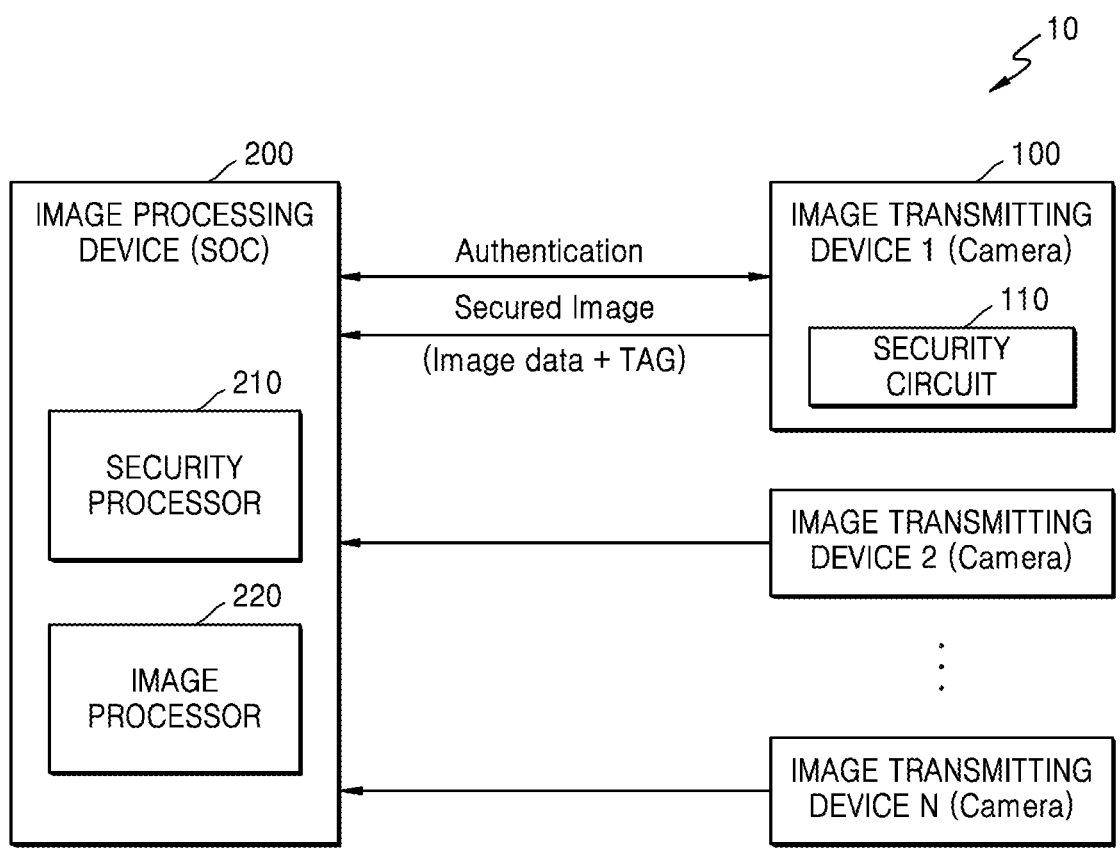
FIG. 1 is a block diagram illustrating an image transmitting device and an image processing system including the same, according to an example embodiment.

FIG. 1 is a block diagram illustrating an image transmitting device 100 according to an example embodiment may be applied and an image processing system 10 including the same. For example, the image processing system 10 may include the image transmitting device 100 and an image processing device 200. The image transmitting device 100 may be a camera device for performing a photographing operation by using a camera lens. In this case, the image processing system 10 may correspond to a camera system. The image processing system 10 may be applied to one of various kinds of systems. For example, the image processing system 10 may be applied to an autonomous system (or an autonomous module).

The image processing device 200 may receive an image (or image data) transmitted from the image transmitting device 100 and may perform a processing operation on the image (or the image data). According to an embodiment, the image processing device 200 may include a semiconductor chip implemented to be separate from the image transmitting device 100. As an example of the semiconductor chip, in FIG. 1, a system on chip (SOC), in which a processor and an image processing module are integrated in one semiconductor chip, is illustrated. When the image processing system 10 is applied to the autonomous system, the image processing device 200 may be referred to as an advanced driver-assistance system (ADAS) SOC.

According to an embodiment, the image transmitting device 100 may encrypt the image data and provide the encrypted image data to the image processing device 200, and the image processing device 200 may restore an image through decoding processing. In FIG. 1, one image processing device 200 and N image transmitting devices 100 are illustrated as an implementation example of the image processing system 10, where N is a natural number. However, the image processing system 10 may be implemented to have one of other various forms. For example, the image processing system 10 may include more than two image processing devices 200 and the number of image transmitting devices 100 included in the image processing system 10 may vary, including a case where there exists only a single image transmitting device 100.

Assuming that the image processing system 10 is the autonomous system, about ten camera devices may be adopted to a vehicle and an amount of data of an image transmitted by a camera sensor of each of the camera devices may be about 6 to 12 Gbps. It is necessary for the image processing device 200 to analyze large amounts of images received from the camera sensors, to interpret current traffic conditions and obstacles based on the analyzed images, and to execute device control for a subsequent operation in real time. It is necessary to perform a security processing operation for checking whether an image is transmitted from an authorized camera device and whether forgery or falsification does not occur in a process of transmitting an image. When the above security request items are not satisfied, autonomous driving may be controlled by using an image from a hacked camera device or an image forged or falsified in a transmitting process, which may cause a problem that may threaten the life of a driver. In addition, because image processing in an autonomous system involves processing data information in real time, there can be very little to no tolerance for performance degradation.

According to an embodiment, an authentication operation may be performed between the image transmitting device 100 and the image processing device 200, and the image processing device 200 may determine whether the image transmitting device 100 is an authorized device through the authentication. In addition, the image transmitting device 100 may perform a security processing operation (e.g., a security procedure) on an image so that the image processing device 200 may determine whether an image is not forged or falsified, and the image processing device 200 may determine whether the image is not forged or falsified through the security processing operation performed on the received image. In relation to the security processing, the operation of determining whether the image transmitting device 100 is an authorized device may be defined according to device authentication (or camera authentication) and the operation of determining whether the image transmitted by the image transmitting device 100 is not forged or falsified may be defined according to image authentication.

According to an embodiment, for the above-described security function, the image transmitting device 100 may include a security circuit 110 for performing security processing for the device authentication and the image authentication. In addition, the image processing device 200 may include a security processor 210 for the device authentication and the image authentication with the image transmitting device 100 and an image processor 220 for processing the image data transmitted from the image transmitting device 100. The security circuit 110 may include hardware components so that the function of the security circuit 110 may be implemented through hardware signal processing. Alternatively, the function of the security circuit 110 may be implemented as software by a processor executing a program or may be implemented through a combination of hardware and software. In addition, similarly, the security processor 210 and the image processor 220 may be implemented as hardware, software, or the combination of hardware and software so that functions of the security processor 210 and the image processor 220 may be executed.

As an operation example, before a real image is transmitted, the image transmitting device 100 and the image processing device 200 may perform a device authentication process. For example, the device authentication process may be performed during initial driving (or booting) of the image transmitting device 100 or a system may be implemented so that the device authentication process may be performed when the image transmitting device 100 is adopted (e.g., installed) to the image processing system 10 and is initially driven.

When the image transmitting device 100 is authenticated and determined to be an authorized device through the device authentication process, the image transmitting device 100 may transmit the obtained image to the image processing device 200 through an internal or external sensor. According to an embodiment, in order to authenticate the image transmitted by the image transmitting device 100, the security circuit 110 may perform a security processing operation on the image so that the image processing device 200 may determine whether the image is forged or falsified. When the image processing system 10 corresponds to the autonomous system, the image processing device 200 may perform an analysis for autonomous driving by using the image that is transmitted from the image transmitting device 100 on which the device authentication is performed and determining that the image is not forged or falsified.

According to an embodiment, in security processing for the image authentication, the security circuit 110 of the image transmitting device 100 may perform the above-described security processing by generating tag information of the image and transmitting the tag information in addition to the image. For example, the security circuit 110 may generate a message authentication code (MAC) by using the image and previously set information (e.g., a session key shared with the image processing device 200), and transmit the generated MAC to the image processing device 200 with the corresponding image. The image processing device 200 may calculate a MAC by using the received image and the previously set information and determine whether the image transmitted from the image transmitting device 100 is an authorized image (for example, an image that is not forged or falsified) by comparing the MAC transmitted from the image transmitting device 100 with the MAC calculated by the image processing device 200.

In addition, according to an embodiment, the security circuit 110 of the image transmitting device 100 may select only a partial region from a certain image and may generate an MAC by using data of the image of the selected region and the previously set information. In addition, the image processing device 200 may select a region in the same position from the received image, calculate the MAC by using the image data of the selected region and the previously set information, and perform the image authentication by comparing the MAC transmitted from the image transmitting device 100 with the MAC calculated by the image processing device 200. According to an embodiment, the partial region of the image used for generating the MAC may be arbitrarily selected by the image transmitting device 100 or the image processing device 200 may provide information (for example, region information or coordinates) for selecting a partial region to the image transmitting device 100. In addition, the position of the region of the image used for generating the MAC may change in accordance with various methods. For example, a region in a fixed position may be used or a position of a region of an image for generating the MAC may vary every frame or periodically.

According to an example embodiment, it is possible to perform genuine product/device authentication on an image transmitting device such as a camera device in various products including a vehicle product and thereby preventing or reducing vulnerability in the security of the image processing system 10 due to the forged or falsified image. In addition, in performing security processing for image authentication, because the security processing may be performed only on a partial region of the image, it is possible to reduce processing overhead on an image to be transmitted in real time.

Figure 2:
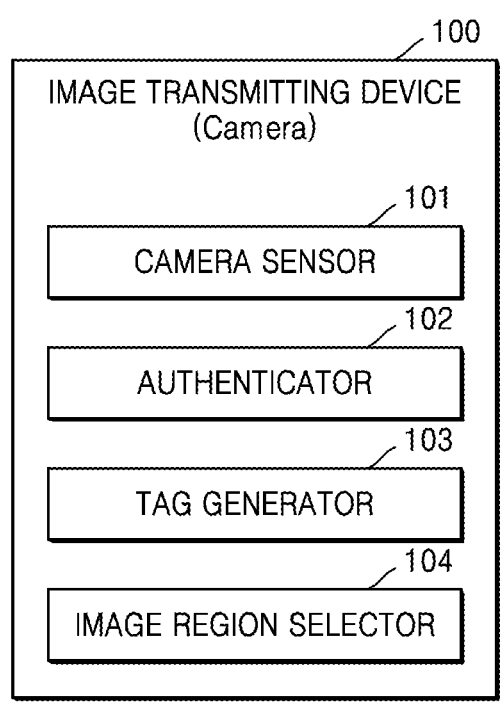
FIG. 2 is a block diagram illustrating an implementation example of the image transmitting device of FIG. 1.

FIG. 2 is a block diagram illustrating an implementation example of the image transmitting device 100 of FIG. 1. In the example illustrated in FIG. 2, the image transmitting device 100 corresponds to a camera device.

Referring to FIGS. 1 and 2, the image transmitting device 100 may include a camera sensor 101, an authenticator 102, a tag generator 103, and an image region selector 104. The camera sensor 101 may include at least one lens and may perform a photographing operation. The image transmitting device 100 may further include an image sensor for generating an image by using information photographed by the camera sensor 101.

According to an embodiment, the authenticator 102, the tag generator 103, and the image region selector 104 may be components included in the security circuit 110 of FIG. 1. The authenticator 102 may perform a mutual authentication operation for device authentication with the image processing device 200 according to the above-described embodiment. For example, the authenticator 102 may perform a challenge-response-based authentication process. Various algorithms may be used for the authentication process. For example, the authentication process may be performed based on a symmetrical key algorithm such as advanced encryption standard (AES) or data encryption standard (DES) or may be performed based on an unsymmetrical key algorithm such as Rivest-Shamir-Adleman (RSA) or elliptic curve cryptography (ECC).

The tag generator 103 may perform the security processing for the image authentication according to the above-described embodiment. For example, the tag generator 103 may generate a tag through an operation performed by using the above-described previously set information and image data. The previously set information may correspond to various kinds of keys. For example, the security processing may be performed by using a key obtained through consultation with the image processing device 200 (or having the same information as the image processing device 200). According to an embodiment, the previously set information may correspond to a session key transmitted and received between the image transmitting device 100 and the image processing device 200 in a session process.

The image region selector 104 may select a region of an image on which the security processing is to be performed based on region information. For example, the region information may be arbitrarily (e.g., randomly) generated by the image transmitting device 100 and data of the region of the image corresponding to the region information may be provided to the tag generator 103. Alternatively, the region information may be information provided from the image processing device 200 to the image transmitting device 100. In addition, like in the above-described embodiment, a position of the region of the image selected by the region information may vary in accordance with time and may arbitrarily change in the image transmitting device 100 or the image processing device 200 may provide the changed region information to the image transmitting device 100.

Figure 3:
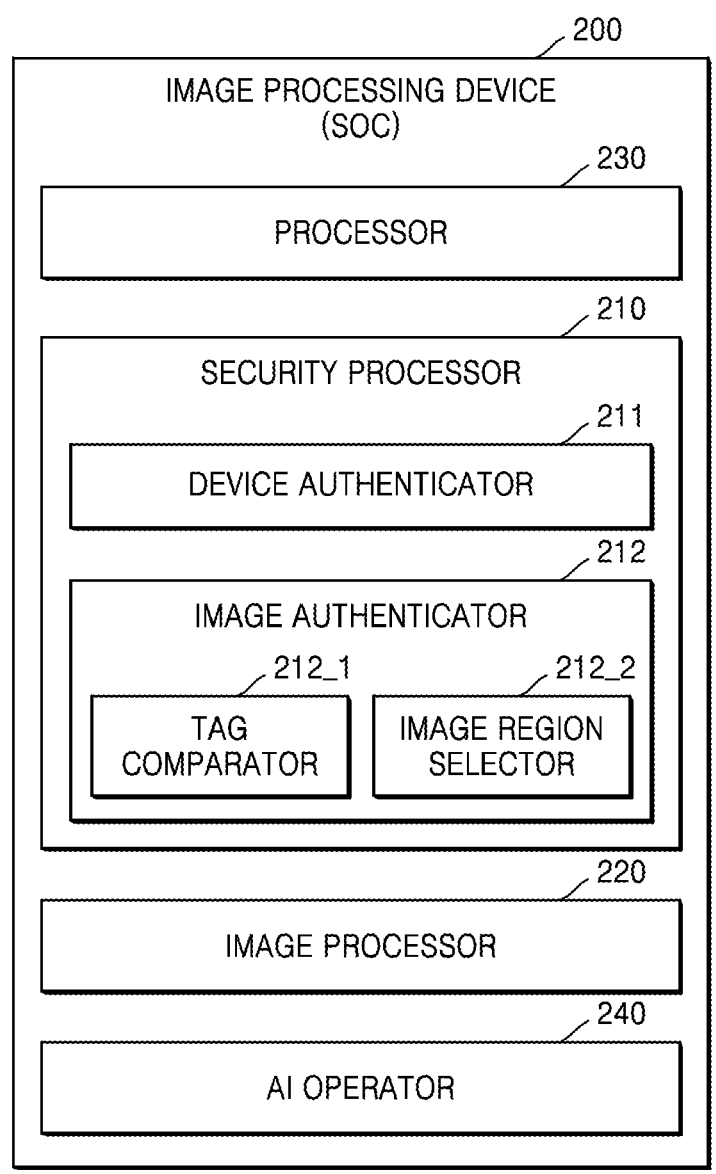
FIG. 3 is a block diagram illustrating an implementation example of the image processing device of FIG. 1.

FIG. 3 is a block diagram illustrating an implementation example of the image processing device 200 of FIG. 1. In FIG. 3, an example in which the image processing device 200 is implemented by an SOC is illustrated. The various modules, components, blocks, and units illustrated in FIG. 3 and any other figures may be implemented with software (e.g., programs, applications, firmware, logic, etc.), hardware (e.g., circuits, semiconductor chips, processors, etc.), or a combination of both.

Referring to FIGS. 1 and 3, the image processing device 200 may include a processor 230, a security processor 210, an image processor 220, and an artificial intelligence (AI) operator 240. At least some functions according to an example embodiment may be implemented by the processor 230 executing programs and operation memory (i.e., main memory) for loading the programs may be further provided in the image processing device 200.

The security processor 210 may perform a mutual authentication operation for device authentication with the image transmitting device 100. The image processor 220 may perform a processing operation on the image data transmitted from the image transmitting device 100. For example, the image processor 220, which may further include a packet processor, may receive a packet including an image, provide information on the authentication processing to the security processor 210, and provide information on the image data processing to the image processor 220.

According to an embodiment, the security processor 210 may include a device authenticator 211 and an image authenticator 212. The image authenticator 212 may include a tag comparator 212_1 and an image region selector 212_2. The image region selector 212_2 may select a region of an image on which the security processing is to be performed by the same or similar method as or to the image transmitting device 100. When the region information is generated by the image processing device 200, the image region selector 212_2 may select the region of the image by using the existing region information. Alternatively, when the region information is transmitted from the image transmitting device 100, the image region selector 212_2 may select the region of the image by using the region information transmitted from the image transmitting device 100. The tag comparator 212_1 may generate a tag by using previously set information such as data and a session key of the selected region, compare the tag transmitted from the image transmitting device 100 with the tag generated by the tag comparator 212_1, and perform image authentication in accordance with the comparison result.

On the other hand, when the image processing system 10 corresponds to an autonomous system, the AI operator 240 may perform an AI operation for the autonomous driving. For example, an image on which image authentication is performed may be provided to the AI operator 240.

Figure 4A:
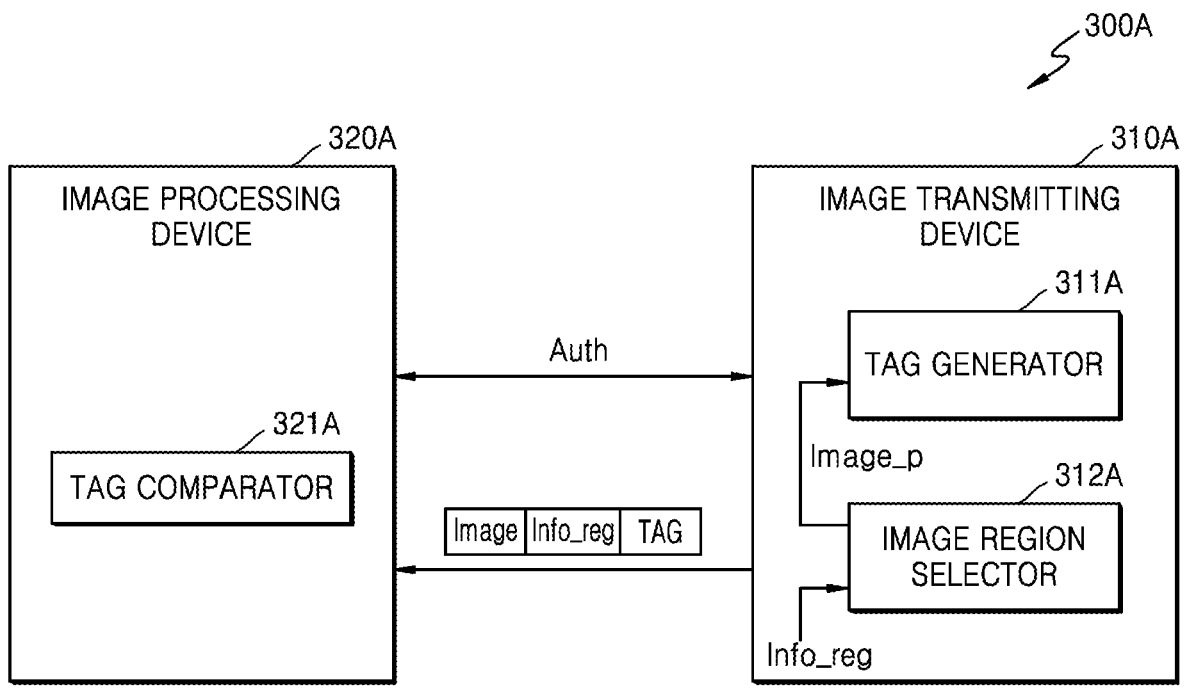
FIGS. 4A and 4B are block diagrams illustrating various operation examples of an image processing system according to an example embodiment.
Figure 4B:
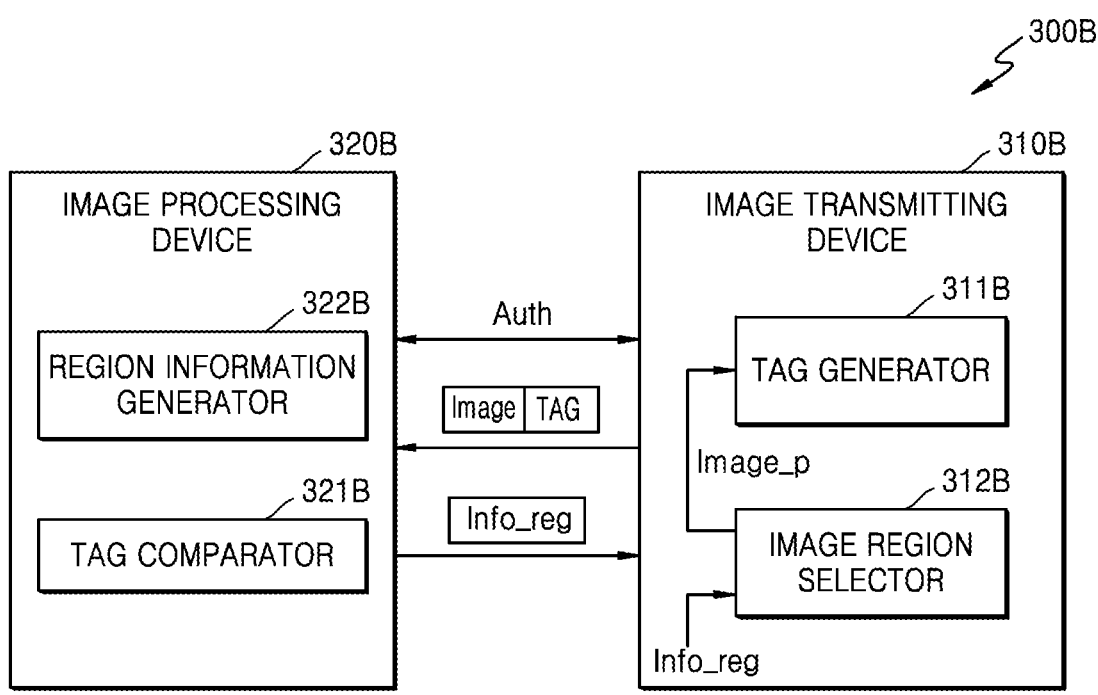

FIGS. 4A and 4B are block diagrams illustrating various operation examples of an image processing system 300A according to an example embodiment. In the example embodiments illustrated in FIGS. 4A and 4B, the above-described region information may be generated by an image transmitting device 310A or an image processing device 320A.

Referring to FIG. 4A, the image processing system 300A may include the image transmitting device 310A and the image processing device 320A. The image transmitting device 310A may include a tag generator 311A and an image region selector 312A. In addition, the image processing device 320A may include a tag comparator 321A. A mutual authentication process Auth for device authentication may be performed between the image transmitting device 310A and the image processing device 320A. In addition, in relation to the above-described image authentication, the image region selector 312A may receive region information Info_reg generated by the image transmitting device 310A and may provide data Image_p on a partial region of an image to the tag generator 311A based on the region information Info_reg, and the tag generator 311A may generate a tag TAG by using the data Image_p and previously set information (for example, a session key). In addition, the image transmitting device 310A may provide the generated tag TAG to the image processing device 320A along with an image Image and the region information Info_reg used for selecting a region to the image processing device 320A. For example, the image Image, the region information Info_reg, and the tag TAG may be included in one packet and may be transmitted to the image processing device 320A.

On the other hand, referring to FIG. 4B, an image processing system 300B may include an image transmitting device 310B and an image processing device 320B. The image transmitting device 310B may include a tag generator 311B and an image region selector 312B. In addition, the image processing device 320B may include a tag comparator 321B and a region information generator 322B.

The region information Info_reg generated by the region information generator 322B is provided to the image region selector 312B of the image transmitting device 310B. The tag generator 311B may generate the tag TAG by using the data Image_p of the partial region of the image and the session key. In addition, the image processing device 320B may receive the image Image and the tag TAG and may select a partial region of the image Image with reference to the region information Info_reg generated by the image processing device 320B. In addition, the tag comparator 321B generates the tag TAG by using the data of the partial region of the image Image and the session key and compares the tag TAG with the tag TAG transmitted from the image transmitting device 310B to perform the image authentication process.

Figure 5:
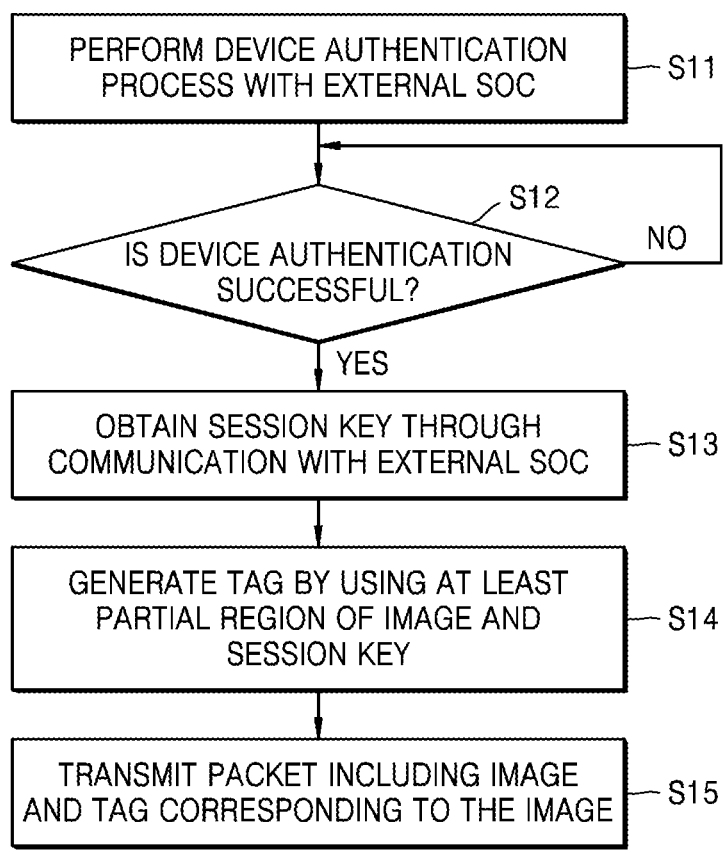
FIGS. 5 and 6 are flowcharts illustrating a method of operating an image transmitting device according to an example embodiment.
Figure 6:
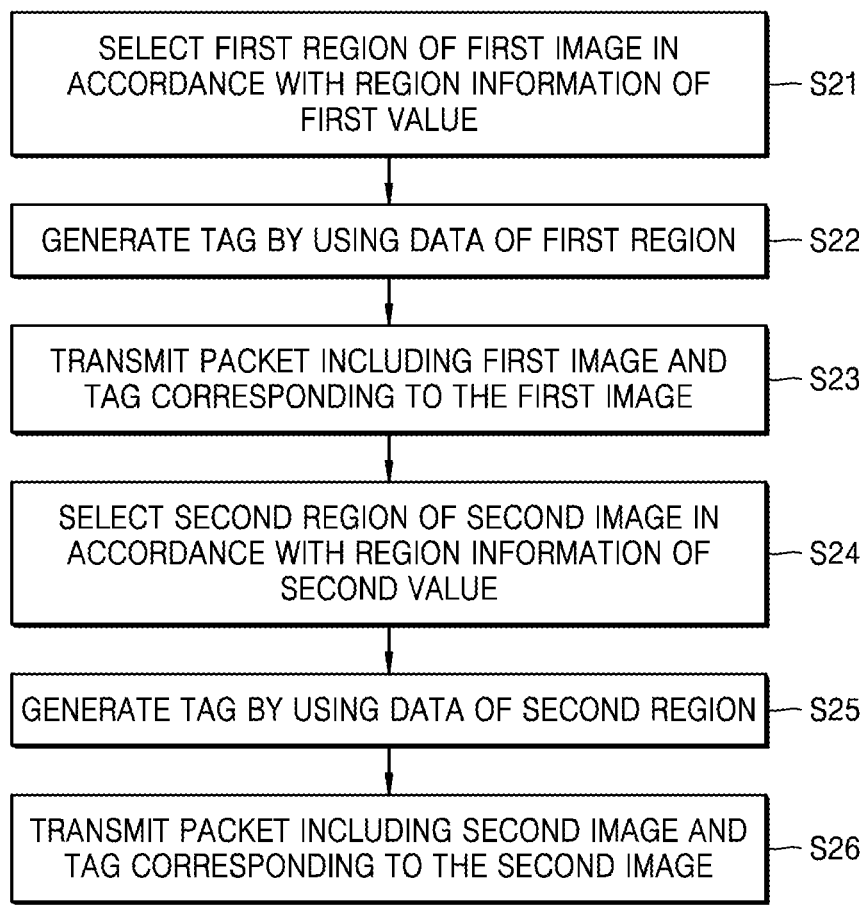

FIGS. 5 and 6 are flowcharts illustrating a method of operating an image transmitting device, according to an example embodiment. In FIGS. 5 and 6, it is assumed that the above-described image processing device is implemented in an SOC.

Referring to FIG. 5, the image transmitting device such as a camera device may perform the device authentication process with an external SOC in operation S11. For example, the image transmitting device may perform the device authentication process with the SOC through the challenge-response-based device authentication process. According to the above-described process, it is determined whether the device authentication is successful in operation S12. When it is determined that the device authentication is not successful, communication for image transmission is not performed between the corresponding image transmitting device and the external SOC. On the other hand, when it is determined that the device authentication is successful, the image transmitting device may transmit an image to the SOC, and the SOC may use the received image for a previously set purpose (for example, an image material of the autonomous system) through processing and analyzing operations performed on the received image.

On the other hand, the image transmitting device may perform the security processing for the image authentication in performing image transmission. For example, a key (for example, the session key) used for the security processing may be obtained by the image transmitting device through communication between the image transmitting device and the SOC in operation S13. The image transmitting device may generate a tag such as a MAC through an operation using data of at least a partial region of an image and the obtained session key in operation S14, generate a packet including the image and a tag generated to correspond to the image, and transmit the generated packet to the SOC in operation S15. The external SOC may perform image authentication by comparing the tag provided to correspond to the image with the tag generated by the external SOC, and use the image on which the image authentication is normally performed for the above-described previously set purpose.

FIG. 6 illustrates an example in which a position of a region selected from an image varies in selecting a region of an image used for generating a tag. Referring to FIG. 6, the image transmitting device may select a region of a position indicated by the region information from a certain image based on previously set region information. For example, in accordance with region information of a first value, the image transmitting device selects a first region of a first image in operation S21 and may generate a tag by using data of the first region in operation S22. For example, the tag is generated through the operation using the data of the first region and the above-described session key and the packet including the first image and the tag corresponding to the first image may be transmitted to the external SOC in operation S23.

According to an embodiment, a position of a region selected from an image in order to generate a tag may vary for every frame or every uniform period (i.e., time interval). For example, in accordance with region information of a second value, the image transmitting device may select a second region of a second image in operation S24, and a position of the first region and a position of the second region may be different from each other in a certain image. In addition, a tag may be generated by using data of the second region of the second image in operation S25, and a packet including the second image and the tag corresponding to the second image may be transmitted to the external SOC in operation S26.

FIGS. 7 to 10 are block diagrams illustrating an implementation example of a camera system 20 according to an example embodiment. Hereinafter, in describing example embodiments of the present disclosure, it is assumed that the image transmitting device is a camera device and the image processing device is an SOC (or an ADAS SOC). In addition, components illustrated in the following embodiments may implement various functions described in the previous embodiments. Although the functions are the same as or similar to each other, names of the components may be different from those of the previous embodiments.

Figure 7:
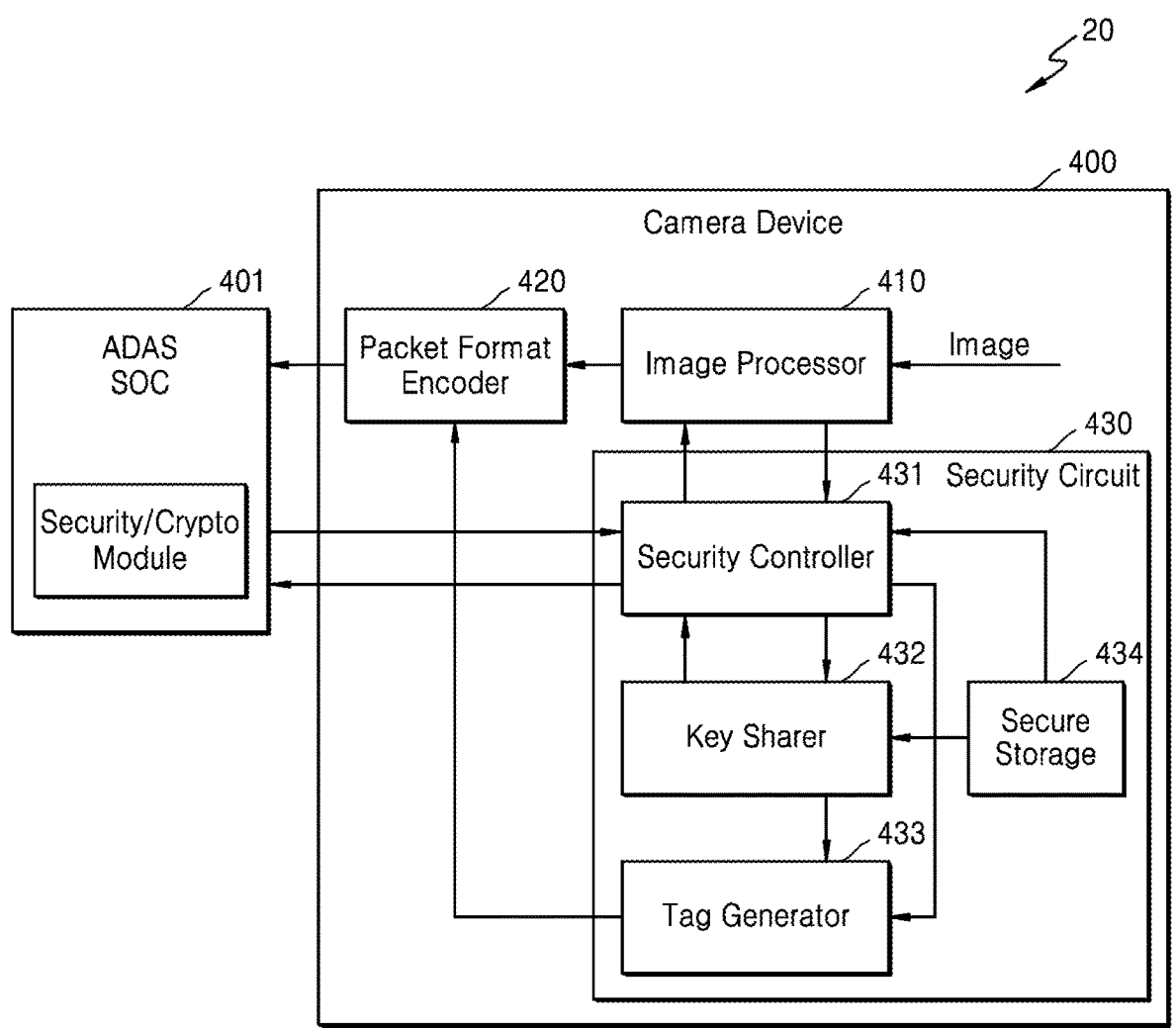
FIGS. 7 to 10 are block diagrams illustrating an implementation example of a camera system according to an example embodiment.

Referring to FIG. 7, the camera system 20 may include a camera device 400 and an ADAS SOC 401 for receiving an image. In FIG. 7, it is illustrated that the image Image is provided from the outside to the camera device 400. However, the camera device 400 may directly generate the image Image through a camera sensor in the camera device 400.

The camera device 400 may include an image processor 410 for processing an image and a packet format encoder 420 for making a transmission format in order to transmit an image to the ADAS SDOC 400. In addition, the camera device 400 may further include a security circuit 430 for performing the device authentication and the image authentication in relation to a security function. The security circuit 430 may further include a security controller 431 transmitting and receiving a command to and from the ADAS SOC 401 and performing or processing the corresponding command, a key sharer 432 for performing an encryption operation in order to generate and exchange the session key between the ADAS SOC 401 and the camera device 400, a tag generator 433 for generating a tag for preventing the transmitted image from being forged or falsified and performing image authentication on the transmitted image, and a secure storage 434 for storing a previously shared key or an authentication certificate for device authentication, and an identifier (ID) such as a product serial number.

In addition, the ADAS SOC 401 for processing the image transmitted from the camera device 400 may include a security/crypto module. The security/crypto module may perform a function of the security processor 210 in the above-described embodiment. The security/crypto module may perform various security processing functions related to the device authentication and the image authentication and an encrypting/decoding processing function based on hardware, software, or a combination of hardware and software. In addition, although not shown in FIG. 7, the ADAS SOC 401 may further include a packet processor for decoding the received packet, a key storage for storing various key information items on the device authentication and the image authentication, and an image processing module for processing the image data.

In the embodiment illustrated in FIG. 7 and the following embodiments, functions that may be performed by the components will be additionally described as follows.

The image processor 410 for processing an image collected by the camera sensor or an image provided from the outside may transmit data of a certain region of an image to the security controller 431 in accordance with information (for example, region information) received from the security controller 331 with an image processing function of an existing camera device.

On the other hand, the packet format encoder 420 for packetizing an image to be transmitted may add a code (for example, a MAC) generated for the image authentication to a header or footer of a packet.

The security controller 431 may manage the security function of the camera device. For example, the security controller 431 may transmit and receive certain information (a random challenge, an encrypted message, an electronic signature, etc.) to and from the ADAS SOC 401 through communication, transmit region information representing a region of a certain position of image data to the image processor 410 to receive data of the corresponding region, transmit data of the received image to the tag generator 433, transmit a session key secured by the key sharer 432 to the tag generator 433, and transmit a certain value stored in the secure storage 434 to the ADAS SOC 401 or set the certain value in the key sharer 432.

On the other hand, the key sharer 432 may decode the session key transmitted by the ADAS SOC 401 and information on a certain region of an image to which the MAC is applied. For example, a public key cryptosystem such as the RSA or the ECC may be applied or a secret key cryptosystem such as the AES may be applied. In addition, the ADAS SOC 401 may generate a key and transmits the generated key to the camera device 400 or the ADAS SOC 401 and the camera device 400 may share the session key by using a key exchange protocol such as Diffie-Hellman (DH) or Elliptic-curve Diffie-Hellman (EC-DH). The decoded session key and the region information may be transmitted to the security controller 431 or the tag generator 433.

On the other hand, the tag generator 433 may perform a MAC operation on the image data received from the security controller 431 by using the session key received from the key sharer 432. The MAC value obtained as the operation result may be transmitted to the packet format encoder 420 and transmitted to the ADAS SOC 401.

On the other hand, the secure storage 434 may be a storage circuit for safely storing a private/public key pair and a certificate of the camera device 400 or a pre-shared key between the camera device 400 and the ADAS SOC 401. A value that is allowed to be published and is not allowed to be forged or falsified such as the ID of the camera device 400 may be stored in the secure storage 434.

On the other hand, the ADAS SOC 401 may include a main processor in charge of the autonomous driving in an automotive product. According to the current embodiment, because the automotive product is described as an example, a corresponding entity is defined as the ADAS SOC. However, the ADAS SOC 401 may correspond to an entity for processing, analyzing, and storing the image transmitted by the camera device 400.

On the other hand, the components of the camera device 400 illustrated in FIG. 7 may be variously implemented. For example, a processor for executing programs may be further included in the camera device 400 and functions of the components illustrated in FIG. 7 may be performed by the processor executing the programs stored in the main memory in the camera device 400. Alternatively, the components in the camera device 400 may include circuits for performing corresponding functions so that the functions may be performed as hardware. Alternatively, the components included in the camera device 400 may be also implemented by a combination of hardware and software.

Hereinafter, more detailed operations of the camera system 20 illustrated in FIG. 7 will be described.

Figure 8:
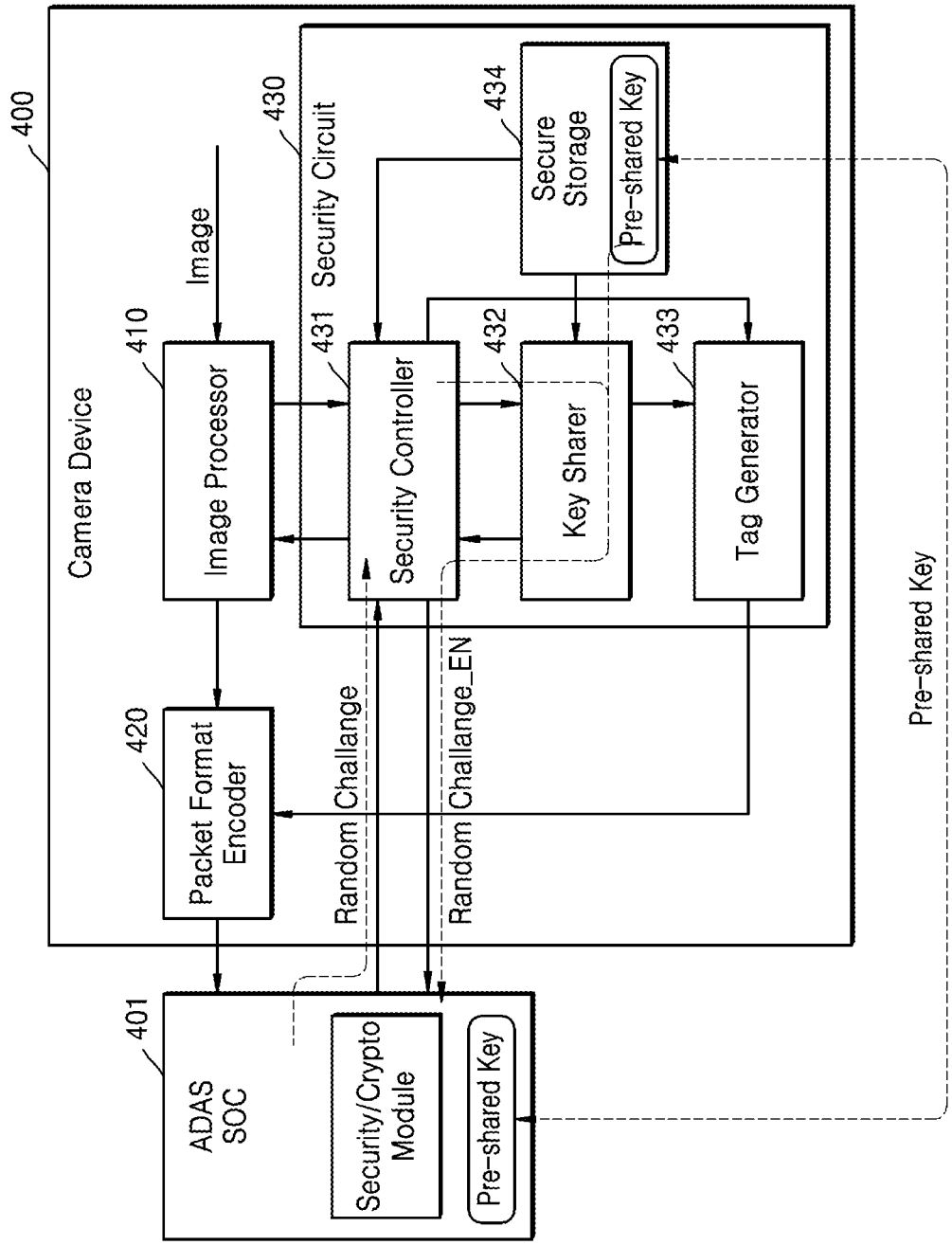

FIG. 8 illustrates an example in which the camera device 400 and the ADAS SOC 401 may perform device authentication by the pre-shared key. For example, the camera device 400 and the ADAS SOC 401 may perform a challenge-response-based authentication process. In the authentication process, the ADAS SOC 401 may determine whether the camera device 400 is an authorized device, which may be performed by checking ownership of a pre-shared key. The authentication process may be performed in the following order.

Each of the camera device 400 and the ADAS SOC 401 may own (e.g., have access to) the pre-shared key. The pre-shared key is a key of block cipher such as the AES. The ADAS SOC 401 and the camera device 400 may share the same key. It is necessary for the pre-shared key to be safely stored in the secure storage 434 of the camera device 400.

For example, in order to determine whether the camera device 400 is the authorized device, the ADAS SOC 401 may determine whether the camera device 400 owns the pre-shared key based on the challenge-response method. For this purpose, the ADAS SOC 401 may generate a random challenge having an arbitrary value (for example, a random number of a previously set bit) and may transmit the generated random challenge to the camera device 400.

The camera device 400 that receives the random challenge, may encrypt the random challenge by using the pre-shared key stored in the secure storage 434 and transmit the encrypted random challenge Random Challenge_EN to the ADAS SOC 401. At this time, besides the random challenge Random Challenge_EN, information that is public information such as a product number (ID) of the camera device 400 and that may distinguish the camera device 400 may be further transmitted to the ADAS SOC 401.

The ADAS SOC 401 may store the previously received product number (ID) information of the camera device 400, decode a cryptogram received from the camera device 400 by using the pre-shared key, determine whether the decoded plaintext is the same as the random challenge transmitted by the ADAS SOC 401, and determine whether the product number (ID) received from the camera device 400 is the same as the previously stored information. According to the result of the determination, the camera device 400 that includes the pre-shared key may be authenticated as the authorized device.

Different camera devices may use the same pre-shared key or different pre-shared keys. When the camera devices use different pre-shared keys, the ADAS SOC 401 may include a database in which the product IDs and keys of the camera devices 400 are arranged.

Figure 9:
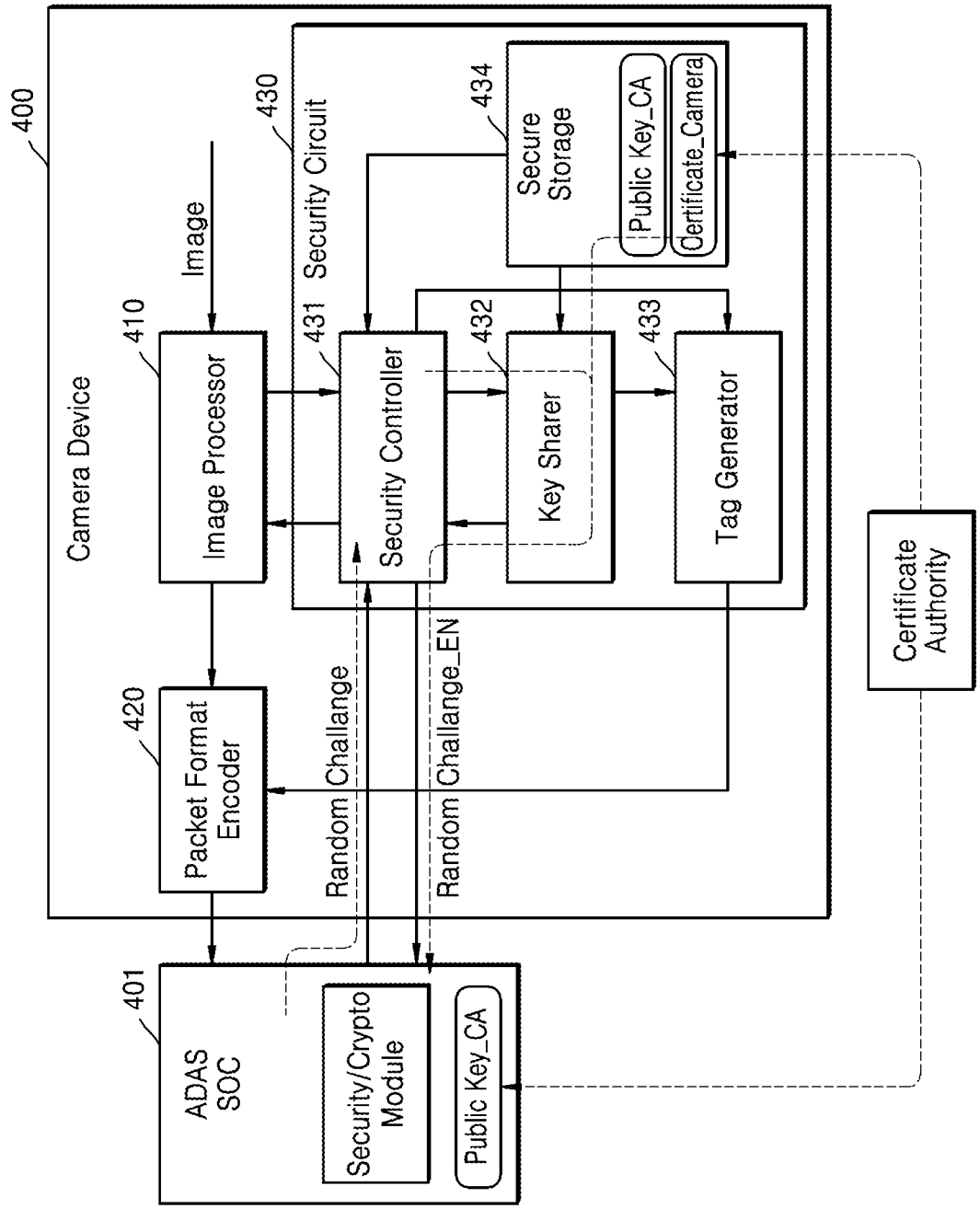

FIG. 9 illustrates an example in which the camera device and the ADAS SOC perform the device authentication by the public key cryptosystem.

In an authentication method using the public key cryptosystem, it is not necessary to previously share the key and, although a private key is exposed, only one product is to be revoked. For example, certificate authority (CA) may be necessary in order to apply the public key cryptosystem. The authentication method based on the public key cryptosystem may be performed in the following order.

The CA may transmit a public key (for example, a CA public key Public Key_CA) to the ADAS SOC 401 and issue a certificate for the private key of the camera device 400. For example, in order to determine whether the camera device 400 is an authorized device, the ADAS SOC 401 may determine whether the camera device 400 owns the private key based on the challenge-response method. For this purpose, the ADAS SOC 401 may generate a challenge according to a challenge-response scheme and may transmit the generated challenge to the camera device 400.

The camera device 400 that receives the challenge may digitally sign the challenge-response by using the private key stored in the secure storage 434 and may transmit a digitally signed response to the ADAS SOC 401 according to the challenge-response scheme. At this time, the camera device 400 may transmit its certificate to the ADAS SOC 401.

The ADAS SOC 401 may verify the certificate transmitted by the camera device 400 by the CA public key Public Key_CA to secure the public key of the camera device 400, verify the digital signature transmitted by the camera device 400 by using the secured public key, and determine whether the camera device 400 is an authorized device in accordance with the verification result.

Figure 10:
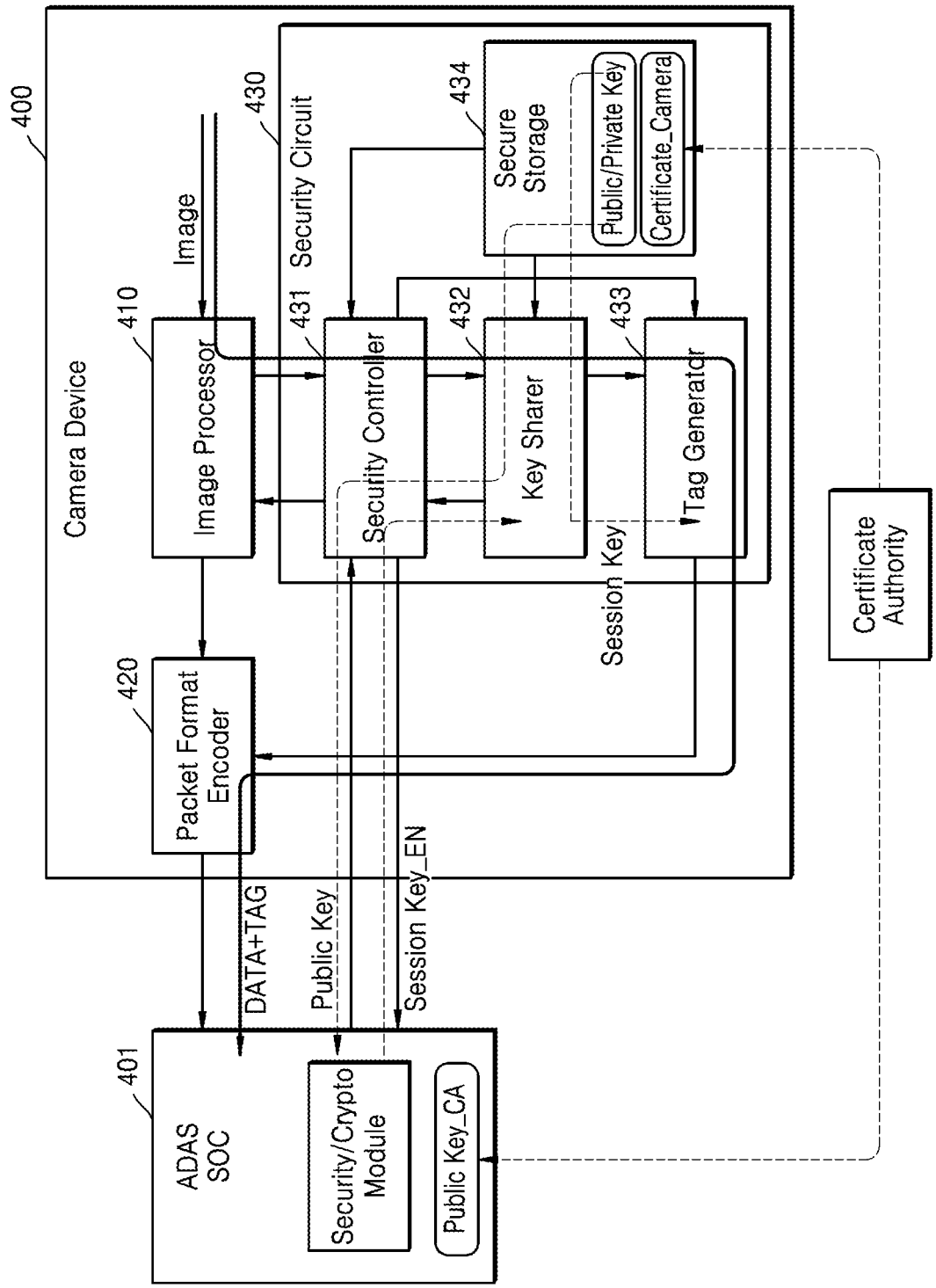

FIG. 10 illustrates an example in which the camera device and the ADAS SOC perform the device authentication through transmission of the session key and processes after the transmission of the session key.

The device authentication based on the session key method may be performed by a partially similar method to the authentication method using the above-described public key cryptosystem. When the ADAS SOC 401 may generate the session key encrypts the session key by the public key of the camera device 400, and transmit the encrypted session key. The camera device 400 may decode information provided from the ADAS SOC 401 by using its private key to secure the session key and perform subsequent communication by using the session key. Therefore, because only the authorized camera device 400 that owns the private key may successfully perform a subsequent operation, it is possible to determine whether the camera device 40 is an authorized device by determining, without an additional authentication process, whether the subsequent communication is correctly performed.

Like in the above-described public key cryptosystem, the ADAS SOC 401 may secure the public key of the camera device 400 by securing and verifying the certificate of the camera device 400. In addition, the ADAS SOC 401 may generate the session key, encrypt the session key by using the pubic key of the camera device 400, and transmit the encrypted session key to the camera device 400. The camera device 400 may secure the session key by decoding the received cryptogram by its private key. The corresponding session key may be used for authenticating a subsequent image. When the image authentication is successfully performed, the ADAS SOC 401 may authenticate that the camera device 400 is the authorized device.

Like in the above-described embodiments, after the device authentication is successfully performed, the image authentication may be performed by using at least a partial region of an image and a session key. On the other hand, when the device authentication fails, the ADAS SOC 401 may stop communicating with or disconnect from a camera device whose device authentication has failed and/or revoke an image transmitted from the camera device.

Hereinafter, various embodiments in which the image authentication is performed are disclosed. The image authentication operation may be performed after the device authentication according to the above-described embodiments is completed and may be performed between the camera on which the device authentication is performed and the ADAS SOC.

Figure 11:
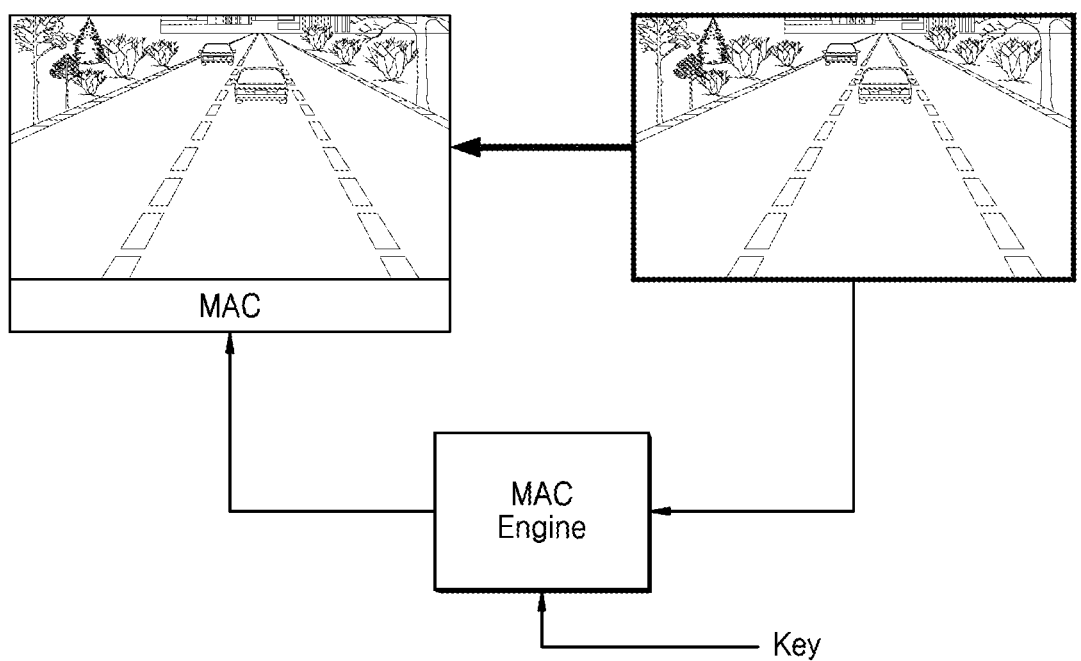
FIGS. 11 and 12 are views illustrating an example in which image authentication is performed by using an MAC operation.
Figure 12:
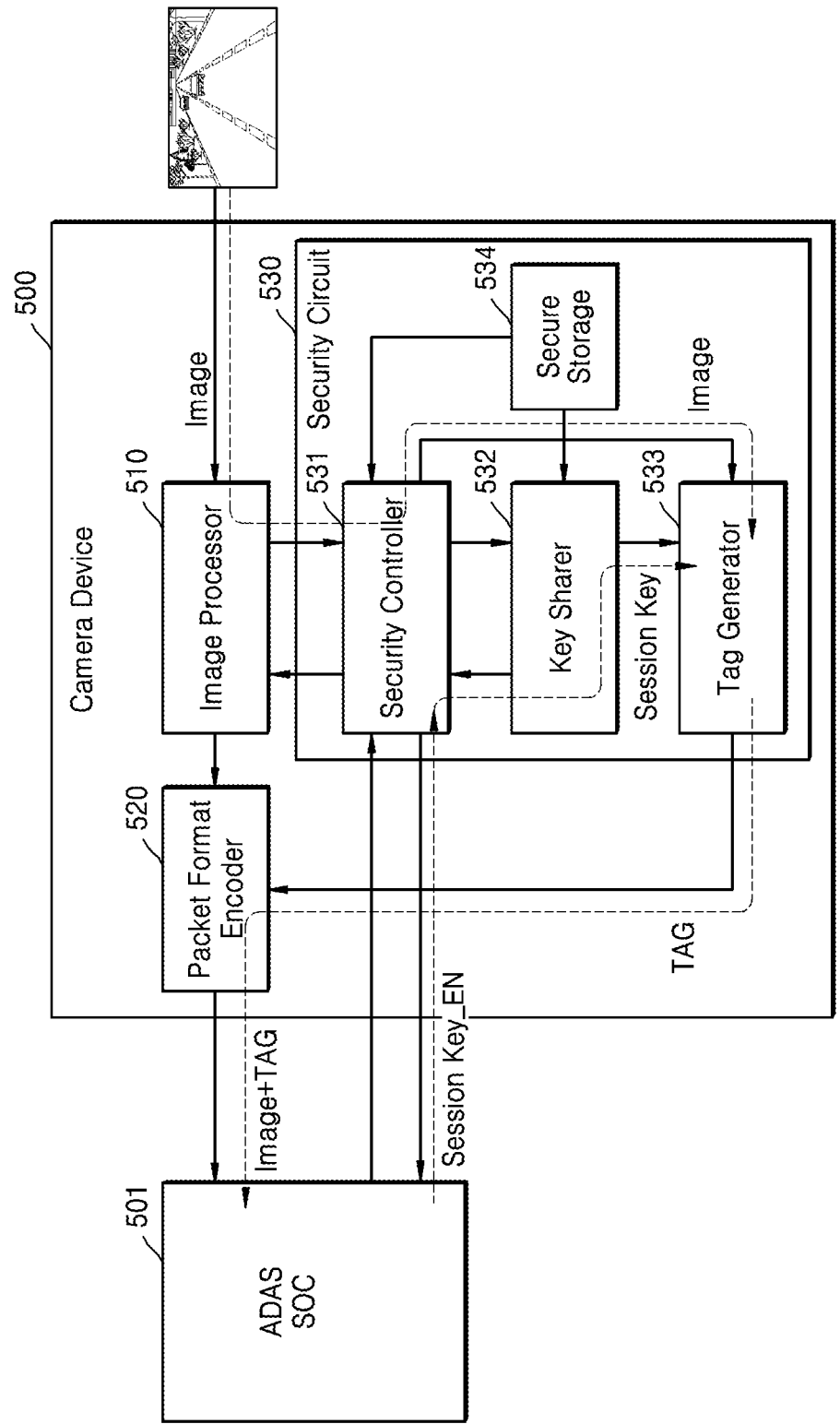

FIGS. 11 and 12 are views illustrating an example in which image authentication is performed by using a MAC operation. FIGS. 11 and 12 illustrate an example in which a MAC operation is performed by using all image data.

The image authentication may be performed by various methods. For example, image authentication in which a MAC is used as tag information may be performed. For example, a method of generating the MAC from the image data by using a key (for example, the session key) shared by two entities and adding the MAC to the image transmitted to the ADAS SOC may be applied. For example, at least a partial bit of the session key may be used for generating the MAC and the MAC may be generated by using various kinds of algorithms (for example, algorithms such as Secure Hash Algorithm (SHA), SHA256, and SHA384 or an algorithm MD5). It is possible to prevent a forged or falsified image from being provided to the ADAS SOC 501 through the image authentication process using the MAC.

Referring to FIGS. 11 and 12, the ADAS SOC 501 may encrypt the session key to be used for the image authentication and transmit the encrypted session key to a camera device 500. At this time, various methods such as a public key or a secret key (or a private key) method may be applied to the encryption of the session key. The key used for the encryption may be stored in a secure storage 534 in the camera device 500.

A security controller 531 may transmit the cryptogram received from the ADAS SOC 501 to a key sharer 532, and the key sharer 532 may decode the cryptogram by using a key stored in the secure storage 534 so that the session key may be obtained. The decoded session key may be transmitted to a tag generator 533 and the security controller 531 may transmit an image to the tag generator 533. The tag generator 533 illustrated in FIG. 12 may correspond to the MAC engine illustrated in FIG. 11.

The tag generator 533 may generate the MAC by using the session key and the image data and may transmit the MAC to a packet format encoder 520. The packet format encoder 520 may transmit the MAC to the ADAS SOC 501 in addition to a header or footer of a packet including an image. After receiving the corresponding packet, the ADAS SOC 501 may generate the MAC in the same way as the camera device 500 by using the session key, compare the generated MAC with the MAC included in the packet, determine that the image is an authorized image when the MAC values are equal to each other, and perform a subsequent operation.

According to the embodiment illustrated in FIGS. 11 and 12, because the authentication process according to the above-described embodiments is performed between the ADAS SOC 501 and the camera device 500 and the camera device 500 authenticated as an authorized device generates a tag for preventing the image data from being forged or falsified and provides the generated tag to the ADAS SOC 501, it is possible to prevent the image data from being forged or falsified in a process of providing the image data to the ADAS SOC 501 thereby reducing the risk of data tampering and performing analysis based on falsified data.

Figure 13:
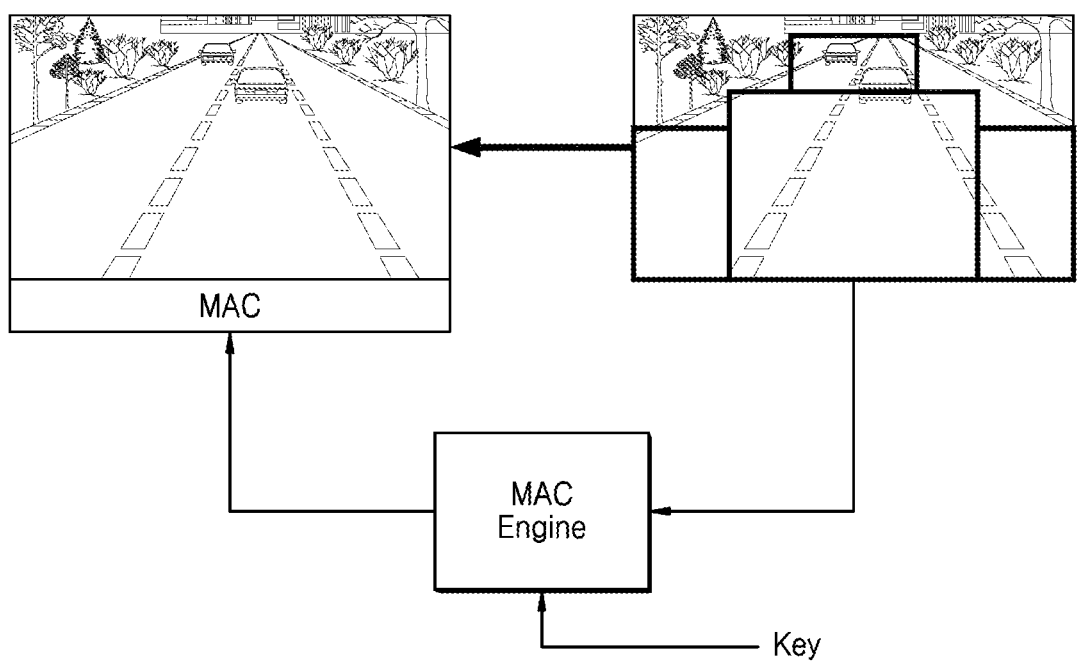
FIGS. 13 and 14 are views illustrating an example in which image authentication is performed by using a partial region of an image.
Figure 14:
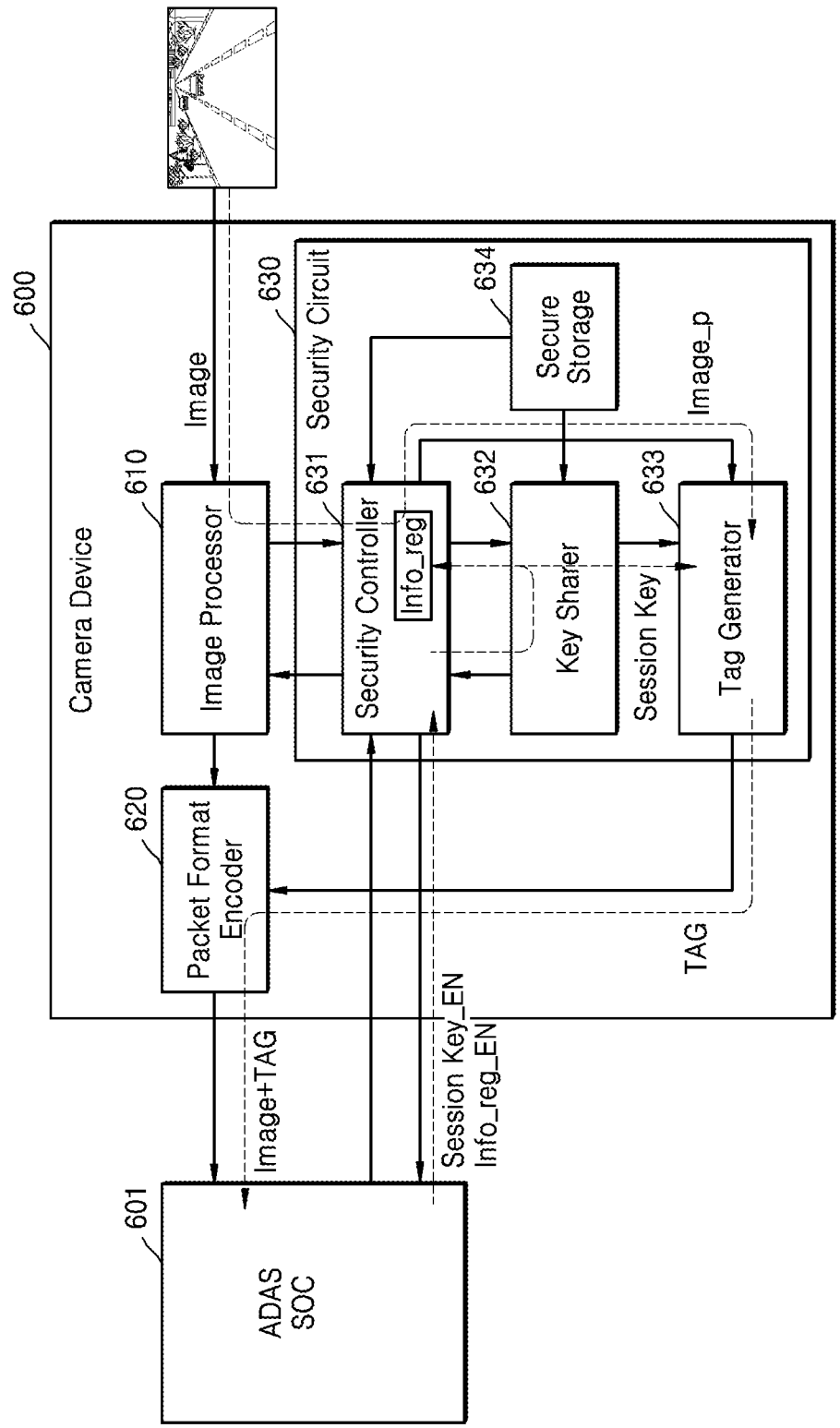

FIGS. 13 and 14 are views illustrating an example in which image authentication is performed by using a partial region of an image.

Referring to FIGS. 13 and 14, a camera device 600 may selectively use data pertaining to only a partial region of a certain image (e.g., a frame image) for generating a MAC. For example, the camera device 600 may generate the MAC by using the data of the partial region of the image and a session key, and then transmit the generated MAC to a packet format encoder 620.

In an example in which the camera device 600 is used for the automotive product, it is necessary that to transmit a large amount of image data and process the transmitted image data in real time. At this time, in order to prevent the performance from deteriorating or to reduce hardware cost as the amount of the image data to be processed is large, the image authentication may be performed by using only data determined to be important (e.g., more relevant for the autonomous driving system's decision-making process) in the image data or data of a region in an arbitrary position.

The region used for generating the MAC may be selected by various methods. For example, information (for example, region information) on a region to which the MAC is to be applied in an image may be previously stored in the camera device 600 or the ADAS SOC 601 in a fixed form and a region in a certain position may be used for a MAC operation in accordance with the previously stored information. Alternatively, the ADAS SOC 601 may encrypt region information Info_reg_EN to which the MAC is to be applied in the image and transmit the encrypted region information Info_reg_EN to the camera device 600. The camera device 600 may generate the MAC by using a region of an image corresponding to the received region information. When a method of the ADAS SOC 601 encrypting the region information and transmitting the encrypted region information is applied, a method of transmitting the region information representing another position of the image every booting or every previously set period may be applied. According to the current embodiment, operations described hereinafter may be performed after authentication between the ADAS SOC 601 and the camera device 600 is completed.

The ADAS SOC 601 may encrypt the session key to be used for the image authentication and transmit the encrypted session key to the camera device 600. Like in the above-described embodiment, an encrypting method used for transmitting the session key may be a public key method or a secret key method and a key used for encryption may be stored in a secure storage 634.

A security controller 631 may transmit a cryptogram received from the ADAS SOC 601 to a key sharer 632. The key sharer 632 may decode the cryptogram by using the key stored in the secure storage 634. The decoded session key may be transmitted to a tag generator 633. In addition, based on the region information that exists in the camera device 600 or the region information provided from the ADAS SOC 601, the region of the image to which the MAC is to be applied may be selected and the region information may be stored in the security controller 631. In addition, the security controller 631 may transmit the partial region of the image to which the MAC is to be applied to the tag generator 633 by using the region information Info_reg.

The tag generator 633 may generate the MAC by using the session key and the data of the partial region of the image, and transmit the generated MAC to the packet format encoder 620. The packet format encoder 620 may transmit the MAC to the ADAS SOC 601 in addition to a header or footer of a packet including an image. After the corresponding packet is received, like in the camera device 600, the ADAS SOC 601 may generate the MAC and compare the generated MAC with the MAC included in the packet. When the MAC values are equal to each other, the ADAS SOC 601 may determine that the image is an authorized image and may perform a subsequent operation.

Figure 15:
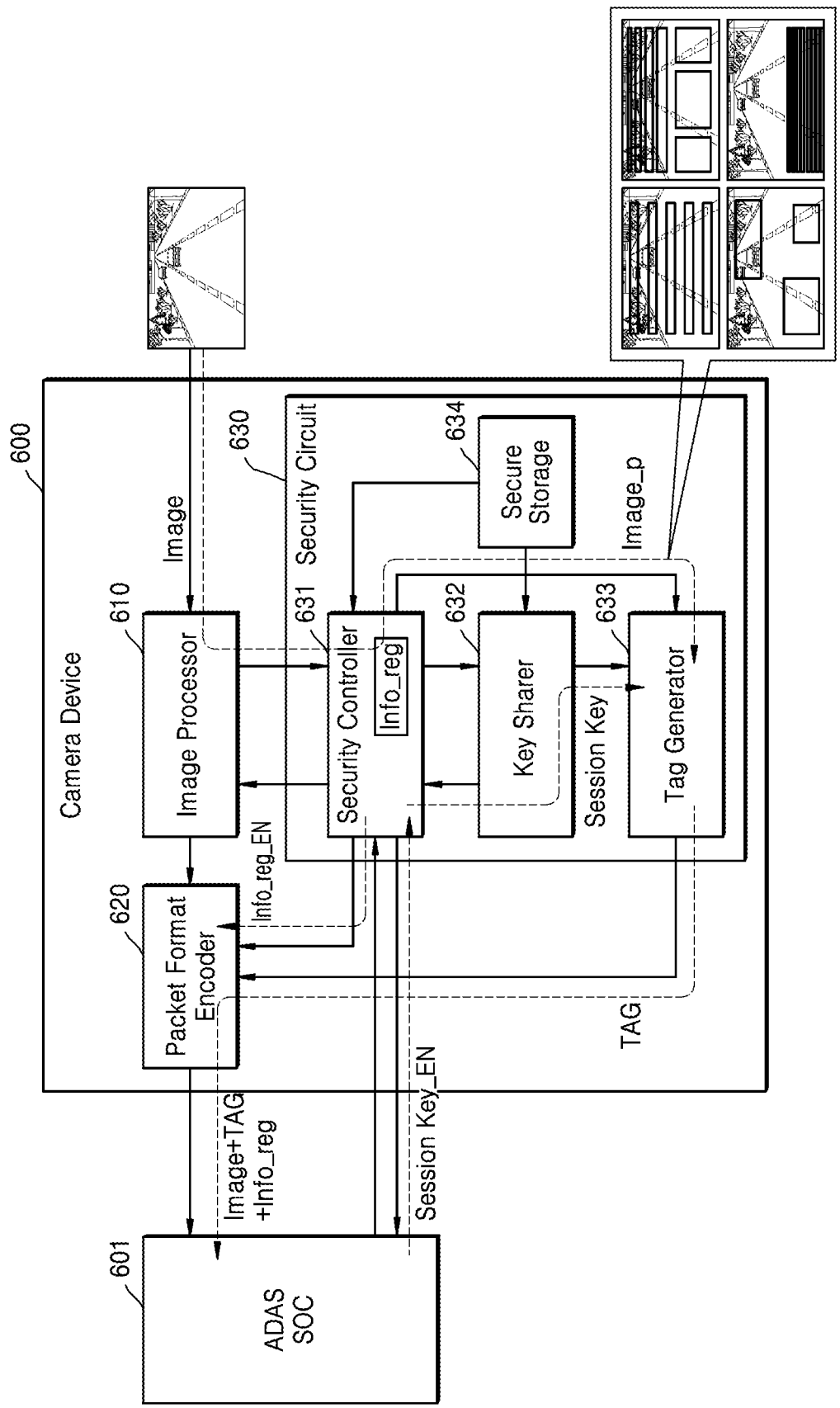
FIG. 15 is a block diagram illustrating an example in which a partial region of an image is randomly selected by a camera device in the above-described embodiment.

FIG. 15 is a block diagram illustrating an example in which a partial region of an image is randomly selected by a camera device in the above-described embodiment. For example, a camera device may change a position of a partial region of an image used for a MAC operation and the change in position is performed every frame or may be performed at a predetermined time interval. Alternatively, the change in position may be performed every time the camera device starts (e.g., boots up).

According to the current embodiment, the MAC may be applied a region arbitrarily selected by the camera device 600 based on the confidence level (e.g., security clearance) of the camera device 600 instead of being applied to a region designated by the ADAS SOC 601. Therefore, according to the current embodiment, an authentication process may be precisely performed on the camera device 600. In addition, because the camera device 600 may select a MAC applied region, region information of an image to be used for a MAC operation with an image may be encrypted and may be transmitted to the ADAS SOC 601. The following operations may be performed after the ADAS SOC 601 authenticating the camera device 600.

The ADAS SOC 601 may encrypt a session key to be used for image authentication and transmit the encrypted session key to the camera device 600 according to the above-described embodiments. As described above, a public key or secret key method may be used for encrypting the session key. The key used for the encryption may be stored in the secure storage 634.

The security controller 631 may transmit a cryptogram received from the ADAS SOC 601 to the key sharer 632. The key sharer 632 may transmit the decoded session key to the tag generator 633. In addition, the security controller 631 may include the region information Info_reg for randomly selecting the region of the image to be applied to the MAC operation as described above. For example, the region information Info_reg may be generated by the security controller 631 or another component in the camera device 600 and be provided to the security controller 631.

The security controller 631 may transmit a partial region of an image, to which the MAC is to be applied, to the tag generator 633 by using the region information Info_reg. The tag generator 633 may generate the MAC by using the session key and data of the partial region of the image, and transmit the generated MAC to the packet format encoder 620.

On the other hand, the security controller 631 may encrypt the above-described region information Info_reg and transmit the encrypted region information Info_ref_EN to the packet format encoder 620. For example, the security controller 631 may encrypt the region information Info_reg by using a partial bit of the session key stored in the secure storage 634 or a key previously shared and stored in the secure storage 634.

The packet format encoder 620 may transmit the generated MAC and the region information Info_reg of the image to which the MAC is applied to the ADAS SOC 601 in addition to a header or footer of a packet including the image. The ADAS SOC 601 may receive the corresponding packet, decode the region information Info_reg, generate the MAC in a partial region of an image selected by the decoded region information Info_reg like the camera 600, compare the generated MAC with the MAC included in the packet, determine that the image is an authorized image when the MAC values are equal to each other, and perform a subsequent operation.

Figure 16:
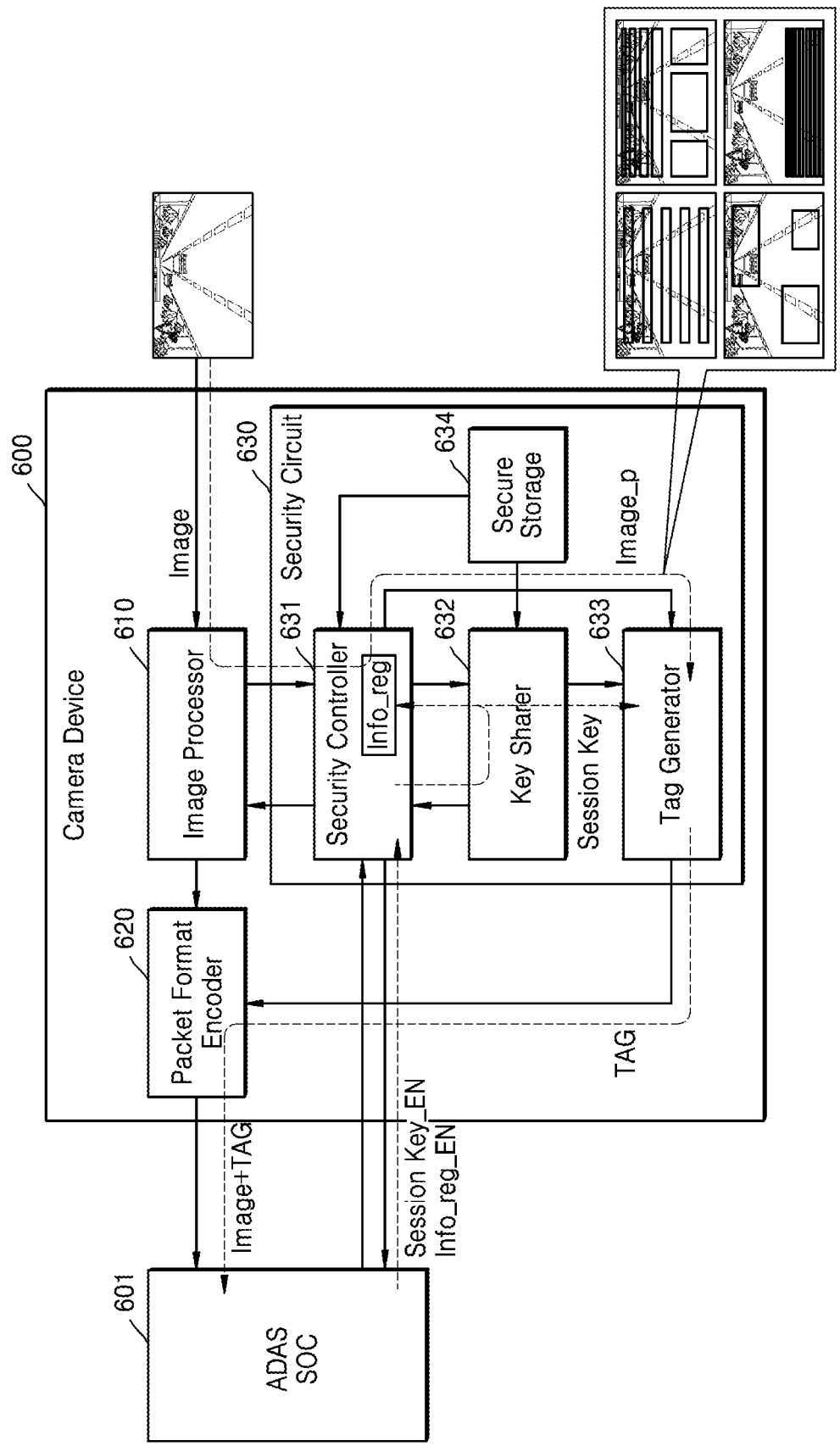
FIG. 16 illustrates an example in which the image authentication is performed based on a challenge-response method in the above-described embodiment.

FIG. 16 illustrates an example in which image authentication is performed based on a challenge-response method in the above-described embodiment. For example, the MAC may be applied to the image by applying the challenge-response method.

According to the current embodiment, image authentication may be performed by using the challenge-response method. When the MAC is generated for an entire image, overhead may be generated. In a case in which the MAC is generated for only a partial region of the image, when an attacker gains knowledge of a region to which the MAC is to be applied, the attacker may try to forge or falsify the other region. In this case, the image may be vulnerable to forgery or falsification attack.

In the method using the challenge-response according to the current embodiment, the ADAS SOC 601 may update an arbitrary region to which the MAC is to be applied at regular time intervals. By applying a security characteristic such as the MAC not to the entire image but to the partial region of the image, it is possible to prevent the performance from deteriorating and to reduce hardware cost and the image region to which the MAC is to be applied is changed by the ADAS SOC 601 in real time so that it is possible to prevent the image from being forged or falsified by the attacker. At this time, the region information provided by the ADAS SOC 601 may be encrypted and transmitted. For example, the region information may be encrypted by a public key of the camera device 600, by an existing shared key, or by a session key. Operations described hereinafter may be performed after performing authentication between the ADAS SOC 601 and the camera device 600 in terms of security.

The ADAS SOC 601 may encrypt the session key to be used for the image authentication and the region information Info_reg representing an arbitrary region to which the MAC is to be applied in the entire image, and transmit the encrypted session key and region information Info_reg to the camera device 600. The encryption method used at this time may be a public key or secret key method. It is necessary for the key used for encryption to be stored in the secure storage 634.

The security controller 631 may transmit the cryptogram received from the ADAS SOC 601 to the key sharer 632. The decoded session key may be transmitted to the tag generator 633. Region information of the MAC applied region of the image may be transmitted to the security controller 631. The security controller 631 may transmit an image of a partial region selected from the entire image by the region information to the tag generator 633.

The tag generator 633 may generate the MAC by using the session key and the image data and may transmit the generated MAC to the packet format encoder 620. The packet format encoder 620 may transmit the MAC to the ADAS SOC 601 in addition to a header or footer of a packet. The ADAS SOC 601 may store the region information provided to the camera device 600 therein, receive the corresponding packet, generate the MAC like the camera device 600 by using the currently held region information, compare the generated MAC with the MAC included in the packet, determine that the image is an authorized image when the MAC values match each other, and perform a subsequent operation.

On the other hand, according to an embodiment, in order to change a position of a region of an image to which the MAC is to be applied at regular time intervals, the ADAS SOC 601 may provide the region information to the camera device 600. For example, the ADAS SOC 601 may provide the region information to the camera device 600 based on the above-described challenge-response at every frame, at every few frames, or at a regular time interval. For example, the ADAS SOC 601 may provide the challenge-response to the camera device 600 in order to change the position of the region of the image on which the MAC operation is to be performed and the camera device 600 may perform a MAC generation operation using image data of a region in another position by frame or by period.

Figure 17A:
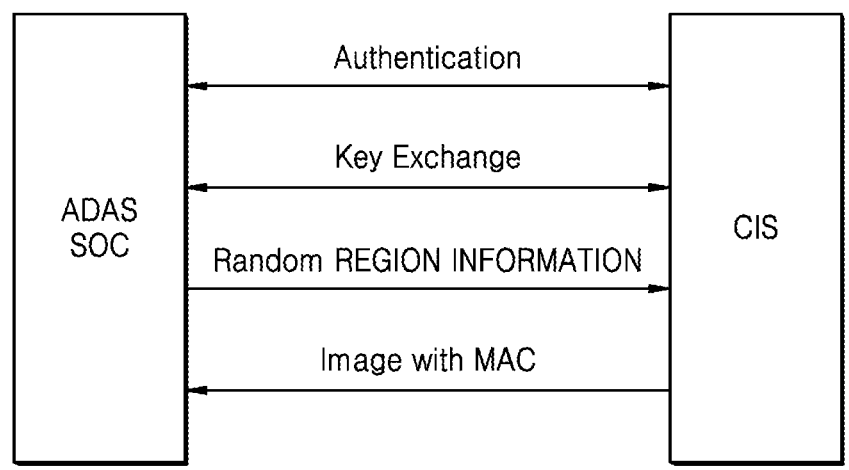
FIGS. 17A and 17B are views illustrating an example processing flow in accordance with a main agent of generation of region information in image authentication.
Figure 17B:
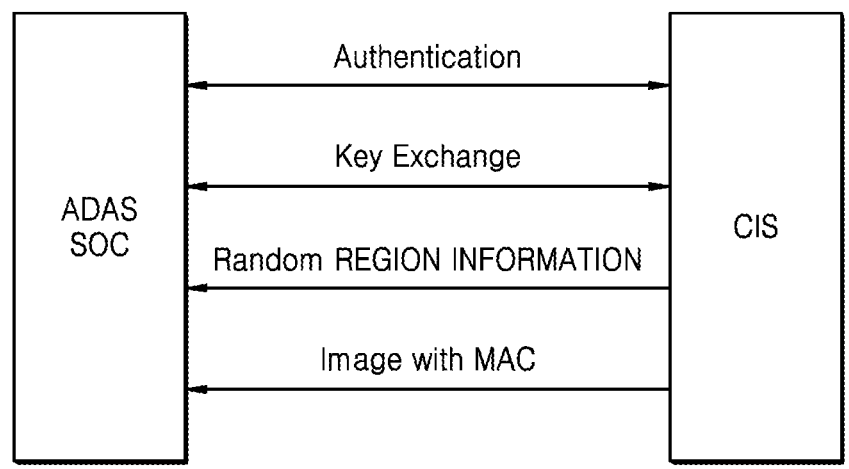

FIGS. 17A and 17B are views illustrating an example processing flow in accordance with a main agent of generation of region information in image authentication. In FIG. 17A, an example in which the ADAS SOC as an image receiver generates region information is illustrated. In FIG. 17B, an example in which the camera device as an image transmitter generates region information is illustrated.

Referring to FIG. 17A, authentication may be performed between the ADAS SOC and the camera device (for example, a complementary metal-oxide-semiconductor (CMOS) image sensor) and key exchange may be performed between the ADAS SOC and the camera device (CIS). In addition, the ADAS SOC provides the region information to the camera device (CIS) and the camera device (CIS) may provide an image including the MAC to the ADAS SOC.

On the other hand, referring to FIG. 17B, authentication is performed between the ADAS SOC and the camera device (for example, a complementary metal-oxide-semiconductor (CMOS) image sensor) and key exchange may be performed between the ADAS SOC and the camera device (CIS). In addition, the ADAS SOC provides the region information to the camera device (CIS) and the camera device (CIS) may provide an image including the MAC to the ADAS SOC.

Figure 18:
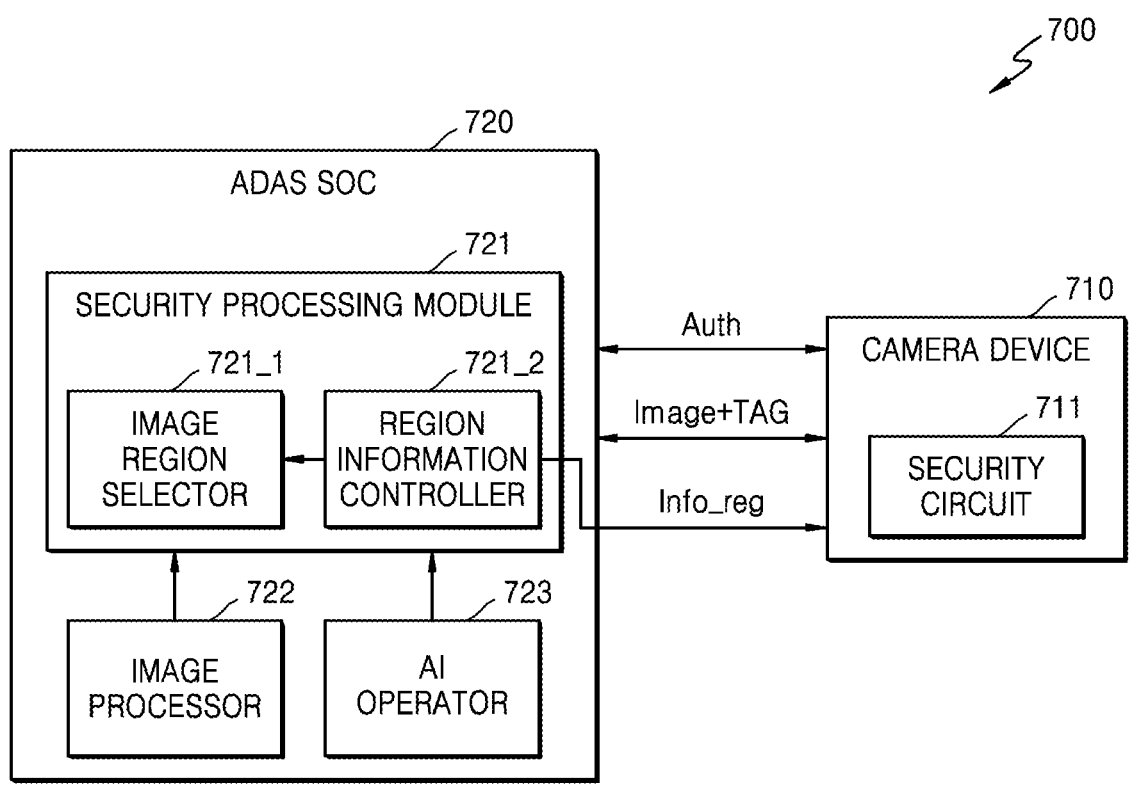
FIG. 18 is a block diagram illustrating an image processing system according to a modifiable embodiment.

FIG. 18 is a block diagram illustrating an image processing system 700 according to a modifiable embodiment.

Referring to FIG. 18, the image processing system 700 may include a camera device 710 as an image transmitting device and may include an ADAS SOC 720 as an image processing device. In addition, the camera device 710 may include a security circuit 711 for performing security processing for device authentication and image authentication in the above-described embodiment. In addition, the ADAS SOC 720 may include a security processing module 721, an image processor 722, and an AI operator 723. The security processing module 721 may include an image region selector 721_1 and a region information controller 721_2. Although not shown in FIG. 18, components for performing various functions in the above-described embodiments may be further provided in each of the camera device 710 and the ADAS SOC 720. For example, the security processing module 721 may further include various components including a component for device authentication, a component for tag generation and comparison, and components for encryption/decoding processing.

According to the current embodiment, the above-described region information Info_reg may be generated by the ADAS SOC 720 and the generated region information Info_reg may be encrypted and transmitted to the camera device 710. In addition, the ADAS SOC 720 may change a position of a region selected by a certain image by periodically or non-periodically changing a value of the region information Info_reg.

According to an embodiment, the value of the region information Info_reg may change based on a result of analyzing a characteristic of a currently captured image. The region information controller 721_2 may generate the region information Info_reg and may change the value of the region information Info_reg based on the result of analyzing the characteristic of the image. For this purpose, the security processing module 721 may receive at least one of the image processing result from the image processor 722 and the image analyzing result from the AI operator 723 and the region information controller 721_2 may change the value of the region information Info_reg based on the received results.

For example, the currently captured image may correspond to an image of a road, a partial region of a certain image may correspond to a background, and the remaining partial region may correspond to the road. At this time, when the image processing system 700 corresponds to an autonomous system, a photographing state of the road region may be mainly used and it is necessary for the image of the road region not to be forged or falsified. The region information controller 721_2 may distinguish the background region from the road region by using image processing results and may change the value of the region information Info_reg so that data of the road region may be selected as a region used for image authentication. For example, the value of the region information Info_reg may change so that the value of the region information Info_reg is periodically or non-periodically changed and the data of the road region may be mainly used.

Alternatively, the region information controller 721_2 may check objects found on the currently captured image in accordance with the image analysis result from the AI operator 723 and the currently captured image may be determined entirely through the objects. The region information controller 721_2 may determine a critical region that must absolutely be free of forgery and may change the value of the region information Info_reg based on the critical region. For example, the region information Info_reg may be generated so that a position of the objects that are more relevant to the driving behavior in autonomous driving (e.g., road, street signs, etc.) are selected for image authentication.

Figure 19:
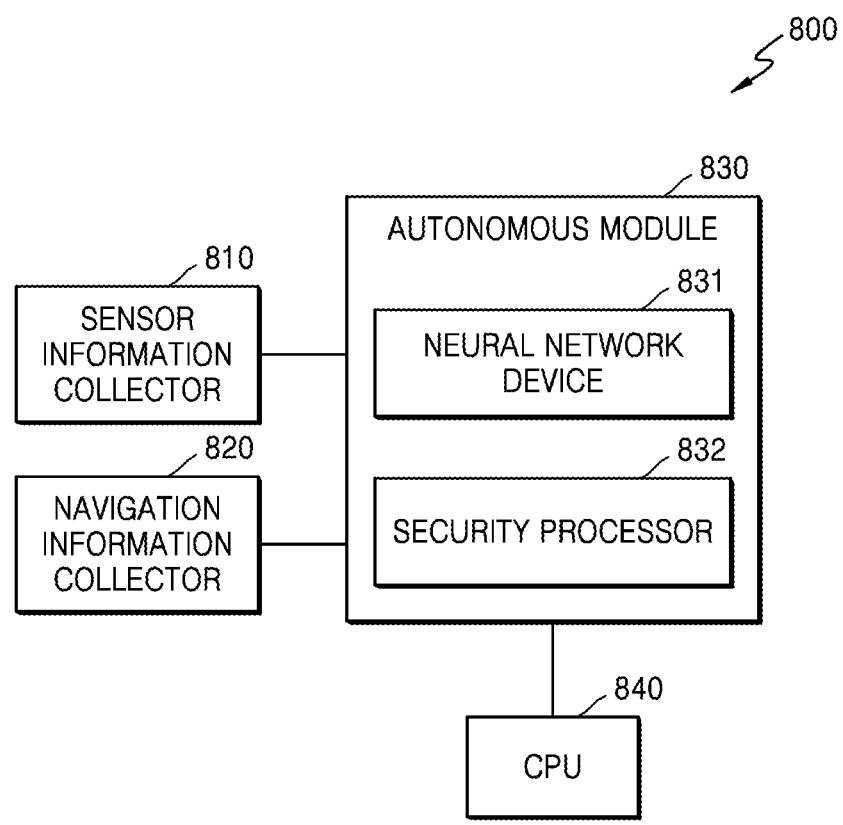
FIG. 19 is a block diagram illustrating an example in which a security processing module is implemented in an autonomous module according to an example embodiment.

FIG. 19 is a block diagram illustrating an example in which a security processing module for image authentication is implemented in an autonomous module adapted to a vehicle according to an exemplary embodiment of the inventive concept. The system illustrated in FIG. 19 may correspond to an autonomous system 800 and the autonomous system 800 may include a sensor information collector 810, a navigation information collector 820, an autonomous module 830, and a central processing unit (CPU) 840. In addition, the autonomous module 830 may include a neural network device 831 and a security processor 832

The neural network device 831 may perform a neural network operation using various image information and voice information and generate information signals such as an image recognizing result and a voice recognizing result based on the neural network operation performing result. For example, the sensor information collector 810 may include devices capable of collecting various image information and voice information such as a camera or a microphone, and provide the various image information and voice information to the autonomous module 830. In addition, the navigation information collector 820 may provide various information items (for example, position information) related to vehicle driving to the autonomous module 830. The neural network device 831 may generate the information signals by executing various kinds of neural network models by using information from the sensor information collector 810 and/or the navigation information collector 820 as an input. When the sensor information collector 810 includes a camera, the camera device as the image transmitting device according to the above-described embodiments may be applied to the camera.

On the other hand, the security processing module 832 may perform the device authentication and the image authentication according to the above-described embodiments. For example, the security processing module 832 may perform the above-described authentication operations based on control of the CPU 840. For example, the security processing module 832 may perform the device authentication with various devices that may be provided in the sensor information collector 810 and may perform the image authentication in the above-described embodiments with devices for transmitting images among the various devices. For example, the security processing module 832 may perform image authentication through security processing using at least a partial region of an image with the devices transmitting the images and may selectively provide only successfully authenticated images to the neural network device 831.

In FIG. 19, an example in which the embodiment of the inventive concept is applied to the autonomous system is described. However, the embodiments of the present disclosure may be applied to products in which security functions are required for camera sensors such as Internet of Things (IoT) and a surveillance camera.

While the present disclosure has been particularly shown and described with reference to example embodiments thereof, it will be understood that various changes in form and details may be made therein without departing from the spirit and scope of the following claims.

What is claimed is:

1. An image transmitting device comprising:
   an image processor configured to process an image to be transmitted to an external device; and
   a security circuit including a key shared with the external device, the security circuit being configured to, based on region information representing a region of a certain position of the image to which a tag used for image authentication is to be applied, generate the tag by using data of only a partial region of the image corresponding to the certain position, from among regions of an entire image, and the key,
   wherein the image transmitting device is configured to transmit the tag, generated to correspond to the image, to the external device with data of the image, and
   wherein the region information is provided by the external device at predetermined time intervals, and the certain position of the image represented by the region information changes each time interval of the predetermined time intervals.

2. The image transmitting device of claim 1, further comprising a packet format encoder configured to generate a packet including the tag provided from the security circuit with the data of the image provided from the image processor.

3. The image transmitting device of claim 1, wherein the security circuit is further configured to receive a session key encrypted through communication with the external device, obtain the session key through a decoding process, and generate the tag by using the obtained session key as the key.

4. The image transmitting device of claim 3, wherein the tag is a message authentication code (MAC) generated by using the data of the partial region of the image and at least a partial bit of the session key.

5. The image transmitting device of claim 1, wherein the security circuit comprises:
   a security controller configured to control an operation in the security circuit for the image authentication;
   a key sharer configured to decode encrypted information provided from the external device, decode an encrypted key received in relation to the image authentication, and obtain the key used for generating the tag; and
   a tag generator configured to generate the tag by using the obtained key and the data of the partial region of the image.

6. The image transmitting device of claim 5, wherein the security circuit further comprises a secure storage configured to store an encryption key used for decoding performed by the key sharer.

7. The image transmitting device of claim 1,
   wherein the security circuit is further configured to decode the encrypted region information and select the partial region of the image by using decoded region information.

8. The image transmitting device of claim 7,
   wherein the certain position of the image represented by the region information further changes in response to the image transmitting device being rebooted.

9. The image transmitting device of claim 1, further comprising:
   a packet format encoder configured to generate a packet including the tag provided from the security circuit with the data of the image provided from the image processor, and transmit the packet to the external device,
   wherein the packet format encoder is further configured to add the tag to a header or footer of the packet.

10. A method of operating an image transmitting device, the method comprising:
    obtaining a session key to be used for image authentication through communication with an external device;
    with respect to an image to be transmitted to the external device, based on region information representing a region of a certain position of the image to which a tag used for the image authentication is to be applied, generating the tag by using data of only a partial region of the image corresponding to the certain position, from among regions of an entire image, and the session key; and transmitting a packet including the image and the tag corresponding to the image to the external device, wherein the region information is provided by the external device at predetermined time intervals, and the certain position of the image represented by the region information changes each time interval of the predetermined time intervals.

11. The method of claim 10, further comprising performing a challenge-response-based device authentication process with the external device, wherein the tag used for the image authentication is selectively generated when the challenge-response-based device authentication process is successfully performed.

12. The method of claim 10, further comprising:

receiving encrypted region information from the external device; and obtaining the region information through decoding the encrypted region information.

* * * * *